US012377751B2

(12) United States Patent
Harris et al.

(10) Patent No.: US 12,377,751 B2
(45) Date of Patent: Aug. 5, 2025

(54) ELECTRIC VEHICLE SUPPLY EQUIPMENT UNIT CONFIGURED IN AN EV CHARGING SYSTEM

(71) Applicant: Atom Power, Inc., Huntersville, NC (US)

(72) Inventors: Michael J. Harris, Concord, NC (US); Ryan Kennedy, Cornelius, NC (US); Denis Kouroussis, Markham (CA); Logan Rosevear, Mooresville, NC (US)

(73) Assignee: Atom Power, Inc., Huntersville, NC (US)

( * ) Notice: Subject to any disclaimer, the term of this patent is extended or adjusted under 35 U.S.C. 154(b) by 8 days.

(21) Appl. No.: 18/178,024

(22) Filed: Mar. 3, 2023

(65) Prior Publication Data

US 2023/0202338 A1 Jun. 29, 2023

Related U.S. Application Data

(63) Continuation-in-part of application No. 17/543,893, filed on Dec. 7, 2021, now Pat. No. 11,884,177.
(Continued)

(51) Int. Cl.
*B60L 53/16* (2019.01)
*B60L 53/67* (2019.01)
*H02J 7/00* (2006.01)

(52) U.S. Cl.
CPC ............... *B60L 53/67* (2019.02); *B60L 53/16* (2019.02); *H02J 7/0031* (2013.01)

(58) Field of Classification Search
CPC ........ B60L 53/67; B60L 53/16; B60L 3/0069; B60L 3/04; B60L 53/11; B60L 53/62;
(Continued)

(56) References Cited

U.S. PATENT DOCUMENTS 4,316,256 A 2/1982 Hendricks et al.
4,644,438 A 2/1987 Puccinelli et al.
(Continued)

FOREIGN PATENT DOCUMENTS

CN 1375923 A 10/2002
CN 1558248 A 12/2004
(Continued)

OTHER PUBLICATIONS

Notice of Allowance for U.S. Appl. No. 17/543,893, mailed Jun. 30, 20223, 8 pages.
(Continued)

*Primary Examiner* — Elim Ortiz
(74) *Attorney, Agent, or Firm* — Withrow & Terranova, PLLC

(57) ABSTRACT

An electric vehicle (EV) charging system includes a plurality of electrical vehicle supply equipment (EVSE) units, a plurality of associated EV charging stations, phase conductors coupled between the charging stations and corresponding bi-directional solid-state switches and a neutral conductor configured to complete charging circuits with associated ones of the phase conductors, and an EVSE communications bus. Each EVSE unit includes a microcontroller unit (MCU) and driver that control current flow through the bi-directional solid-state switches providing charging current to respective EV charging stations and connected plug-in EVs (PEVs). The MCUs communicate over the EVSE communications bus and, as PEVs plug into, charge, and unplug from the plurality of EV charging stations, reallocate or reapportion an available supply current among the plurality of EVSE units while also dynamically adjusting one or more circuit protection attributes provided by the EVSE units.

21 Claims, 21 Drawing Sheets

Related U.S. Application Data

(60) Provisional application No. 63/122,681, filed on Dec. 8, 2020.

(58) Field of Classification Search
CPC ........ B60L 53/63; B60L 53/65; H02J 7/0031; H02J 7/0013; H02J 2310/48; Y02T 10/70; Y02T 10/7072; Y02T 90/12
USPC .................. 307/9.1, 10.1, 10.7, 126, 30, 38; 320/109, 107, 137; 180/65.1, 65.29
See application file for complete search history.

(56) References Cited

U.S. PATENT DOCUMENTS

| | | |
|---|---|---|
| D288,921 S | 3/1987 | Peck |
| D305,019 S | 12/1989 | Pena |
| 5,132,865 A | 7/1992 | Mertz et al. |
| D331,063 S | 11/1992 | Pasierb |
| D334,542 S | 4/1993 | Lowe et al. |
| D351,861 S | 10/1994 | Anderson et al. |
| 5,502,286 A | 3/1996 | Pollman et al. |
| 5,638,038 A | 6/1997 | Suzuki et al. |
| D393,808 S | 4/1998 | Lindsey et al. |
| 5,782,341 A | 7/1998 | Calder et al. |
| 6,008,971 A | 12/1999 | Duba et al. |
| D435,021 S | 12/2000 | Davis et al. |
| D443,586 S | 6/2001 | Sakasegawa |
| D443,595 S | 6/2001 | Pawley |
| 8,582,265 B2 | 11/2013 | Britz |
| D695,234 S | 12/2013 | Santiago et al. |
| D697,033 S | 1/2014 | Hashimoto et al. |
| 8,861,162 B2 | 10/2014 | Fuller et al. |
| 9,287,065 B1 | 3/2016 | Davis et al. |
| D754,615 S | 4/2016 | Chen et al. |
| D768,582 S | 10/2016 | Jacoby et al. |
| D784,168 S | 4/2017 | Jacoby et al. |
| 10,134,551 B2 | 11/2018 | Potter et al. |
| 10,276,321 B2 | 4/2019 | Kennedy et al. |
| 10,541,530 B2 | 1/2020 | Kennedy et al. |
| 10,630,069 B2 | 4/2020 | Kennedy et al. |
| 10,784,061 B2 | 9/2020 | Kennedy et al. |
| 10,804,692 B2 | 10/2020 | Kennedy et al. |
| 10,811,867 B2 | 10/2020 | Kennedy et al. |
| 10,896,790 B2 | 1/2021 | Kennedy et al. |
| 10,896,791 B2 | 1/2021 | Kennedy et al. |
| 11,037,749 B2 | 6/2021 | Kouroussis et al. |
| 2001/0026185 A1 | 10/2001 | Sher |
| 2002/0093774 A1 | 7/2002 | Chung |
| 2007/0121257 A1 | 5/2007 | Maitra et al. |
| 2009/0290275 A1 | 11/2009 | Staszesky et al. |
| 2010/0232082 A1 | 9/2010 | Seger |
| 2010/0301809 A1* | 12/2010 | Bhade .................. B60L 3/0069 320/148 |
| 2011/0026185 A1 | 2/2011 | Boudet et al. |
| 2011/0037429 A1* | 2/2011 | DeBoer ................ B60L 53/305 320/109 |
| 2011/0080677 A1 | 4/2011 | Radosavljevic et al. |
| 2011/0102052 A1 | 5/2011 | Billingsly et al. |
| 2011/0169447 A1 | 7/2011 | Brown et al. |
| 2011/0202418 A1 | 8/2011 | Kempton et al. |
| 2011/0222200 A1 | 9/2011 | Fuller et al. |
| 2011/0285345 A1* | 11/2011 | Kawai .................. H02J 7/0013 320/107 |
| 2011/0292556 A1 | 12/2011 | Britz |
| 2011/0320056 A1 | 12/2011 | Brown et al. |
| 2012/0218676 A1 | 8/2012 | Demetriades et al. |
| 2013/0027829 A1 | 1/2013 | Antoniazzi et al. |
| 2013/0169038 A1 | 7/2013 | King |
| 2013/0310999 A1 | 11/2013 | Baxter et al. |
| 2014/0021917 A1* | 1/2014 | Paupert .................. B60L 53/68 320/109 |
| 2014/0029153 A1 | 1/2014 | Besana et al. |
| 2014/0077761 A1* | 3/2014 | Hamrin .................. B60L 3/12 320/109 |
| 2014/0139182 A1 | 5/2014 | Ichikawa et al. |
| 2014/0268464 A1 | 9/2014 | Dai et al. |
| 2015/0084420 A1 | 3/2015 | Dickerson et al. |
| 2015/0165917 A1 | 6/2015 | Robers et al. |
| 2015/0210232 A1 | 7/2015 | Kanzaki et al. |
| 2015/0236502 A1 | 8/2015 | Xu et al. |
| 2015/0348722 A1 | 12/2015 | Fraser et al. |
| 2016/0197465 A1 | 7/2016 | Poulose et al. |
| 2016/0243951 A1 | 8/2016 | Pritelli et al. |
| 2017/0004948 A1 | 1/2017 | Leyh |
| 2017/0069441 A1 | 3/2017 | Mishrikey et al. |
| 2018/0254643 A1 | 9/2018 | Paluszek et al. |
| 2020/0052507 A1 | 2/2020 | Apeldoorn et al. |
| 2020/0055416 A1 | 2/2020 | Johansen et al. |
| 2020/0266633 A1 | 8/2020 | Baumann et al. |
| 2020/0365346 A1 | 11/2020 | Telefus et al. |
| 2020/0395748 A1 | 12/2020 | Miller et al. |
| 2021/0066013 A1 | 3/2021 | Kumar et al. |
| 2022/0006250 A1 | 1/2022 | Deore et al. |
| 2022/0060102 A1 | 2/2022 | Mazumder et al. |
| 2022/0321016 A1 | 10/2022 | Khaligh et al. |

FOREIGN PATENT DOCUMENTS

| | | |
|---|---|---|
| EP | 3041101 A1 | 7/2016 |
| JP | 3336027 B2 | 10/2002 |

OTHER PUBLICATIONS

Kiedaisch, Jill, "How the World's First Digital Circuit Breaker Could Completely Change the Powered World," Popular Mechanics, www.popularmechanics.com/technology/infrastructure/a27557804/digital-circuit-breaker/, May 22, 2019, 6 pages.

Meckler, "Does an Electronic Circuit Breaker need Electrical Contacts?," Proceedings of the 50th IEEE Holm Conference on Electrical Contacts and The 22nd International Conference on Electrical Contacts, Sep. 20-23, 2004, pp. 480-487.

Signaworks, "Dual On/Off Push Button," Audible and Visual Signals & Custom Application Solutions, www.signaworks.com/products/industrial-push-buttons/dual-on/off-push-bullon.html, Apr. 26, 2014, 2 pages.

Sirajul, "Function and rated characteristics of circuit breaker—all things need to know of circuit breaker," eblogbd.com/details-characteristics-circuit-breaker/, Oct. 20, 2013, 5 pages.

Talebi, Zari, "Eaton's New Narrow Frame Power And Air Circuit Breaker Offers Reduced Size And Improved Safety," www.eaton.com/Eaton/OurCompany/NewsEvents/NewsReleases/CT_238199, Jun. 23, 2009, Eaton, 1 page.

UNCC, "Senior Design Team Works with Atom Power to Design Revolutionary Circuit Breaker," isl.uncc.edu/news/2016-01-29/senior-design-team-works-atom-power-design-revolutionary-circuit-breaker, Jan. 29, 2016, 1 page.

International Search Report and Written Opinion for International Patent Application No. PCT/US2021/062118, mailed Feb. 23, 2022, 13 pages.

Non-Final Office Action for U.S. Appl. No. 17/543,893, mailed Nov. 10, 2022, 23 pages.

Applicant-Initiated Interview Summary for U.S. Appl. No. 18/316,735, mailed Oct. 25, 2024, 2 pages.

Extended European Search Report for European Patent Application No. 21904215.7, mailed Oct. 9, 2024, 14 pages.

\* cited by examiner

| | | |
|---|---|---|
| Total Current Available at EVSEP | 50A | |
| | | |
| | Vehicle A | |
| Total Current Allocation (A) | 50 | |
| Solid State Circuit Breaker (A) | 62.5 | |
| | | |
| | Vehicle A | Vehicle B |
| Time on charge (minutes) | 30 | 50 |
| Time to charge complete (minutes) | 200 | 500 |
| Percent of charge (Calculated) | 0.15 | 0.1 |
| Ratio of charge to be completed (Calculated) | 0.4 | 0.6 |
| | | |
| Vehicle Current Allocation (A) (Calculated) | 20 | 30 |
| Solid State Circuit Breaker (A) | 25 | 37.5 |

FIGURE 9

| | | |
|---|---|---|
| Total Current Available at EVSEP | 50A | |
| | | |
| | Vehicle A | Vehicle B |
| Time on charge (minutes) | 30 | 50 |
| Time to charge complete (minutes) | 200 | 500 |
| Percent of charge (Calculated) | 0.15 | 0.1 |
| Ratio of charge to be completed (Calculated) | 0.4 | 0.6 |
| | | |
| Rate (cents/kwhr) | 3 | 9 |
| Ratio of rate | 0.25 | 0.75 |
| | | |
| Weighting Factor Charge State | 0.6 | |
| Weighting Factor Rate | 0.4 | |
| | | |
| Vehicle Current Allocation from ratio of charge weighting factor (A) | 12 | 18 |
| Vehicle Current Allocation from rate weighting factor (A) | 5 | 15 |
| Total Vehicle Current Allocation (A) (Calculated) | 17 | 33 |

FIGURE 10

ELECTRIC VEHICLE SUPPLY EQUIPMENT UNIT CONFIGURED IN AN EV CHARGING SYSTEM

RELATED APPLICATIONS

This application is a continuation-in-part of U.S. patent application Ser. No. 17/543,893, filed Dec. 7, 2021, now U.S. Pat. No. 11,884,177, which claims the benefit of provisional patent application Ser. No. 63/122,681, filed Dec. 8, 2020, the disclosures of which are hereby incorporated herein by reference in their entireties.

FIELD OF THE DISCLOSURE

The present disclosure relates to electrical distribution systems, protection devices used in electrical distribution systems, and methods and apparatus for dynamically coordinately time-current characteristics of protections devices in electrical distribution systems.

BACKGROUND

Electric vehicle (EV) charging systems are becoming increasingly prevalent in modern society as the transition away from fossil-fuel-powered vehicles toward plug-in electric vehicles (PEVs) continues. Despite many advancements in PEV design in recent years, electric vehicle supply equipment (EVSE) in state-of-the-art EV charging systems remains relatively primitive. To compensate for the limited capabilities, modern EV charging systems tend to be built as "one-size-fits-all" systems. Unfortunately, this one-size-fits-all approach is expensive to implement since it requires the use of oversized electrical power distribution equipment (e.g., heavy gauge cables and wires) in order to accommodate most every conceivable PEV charging need. State-of-the art EVSE also fails to address several safety concerns that are potentially hazardous to EV charging system users. The present disclosure addresses these problems, providing an EV charging system that is not only safer to use and operate but that also maximizes infrastructure usage and avoids the high cost and need for oversized power distribution equipment.

SUMMARY

An electric vehicle (EV) charging system includes a plurality of electrical vehicle supply equipment (EVSE) units, a plurality of associated EV charging stations, phase conductors coupled between the charging stations and corresponding bi-directional solid-state switches and a neutral conductor configured to complete charging circuits with associated ones of the phase conductors, and an EVSE communications bus. Each EVSE unit includes a microcontroller unit (MCU) and driver that control current flow through the bi-directional solid-state switches providing charging current to respective EV charging stations and connected plug-in EVs (PEVs). The MCUs communicate over the EVSE communications bus and, as PEVs plug into, charge, and unplug from the plurality of EV charging stations, reallocate or reapportion an available supply current among the plurality of EVSE units while also dynamically adjusting one or more circuit protection attributes provided by the EVSE units, including, for example, the continuous current rating(s) of one or more EVSE units.

Further features and advantages of the present disclosure, including a detailed description of the above-summarized and other exemplary embodiments of the present disclosure, will now be described in detail with respect to the accompanying drawings, in which like reference numbers are used to indicate identical or functionally similar elements.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 9 is a chart highlighting various charge control and circuit protection attributes involved in a weighting-based charge control and circuit protection method, according to one embodiment of the present disclosure.

FIG. 10 is a chart including various charge control and circuit protection attributes involved in a priority-dependent weighting-based charge control and circuit protection method, according to one embodiment of the present disclosure.

DETAILED DESCRIPTION

Figure 1:
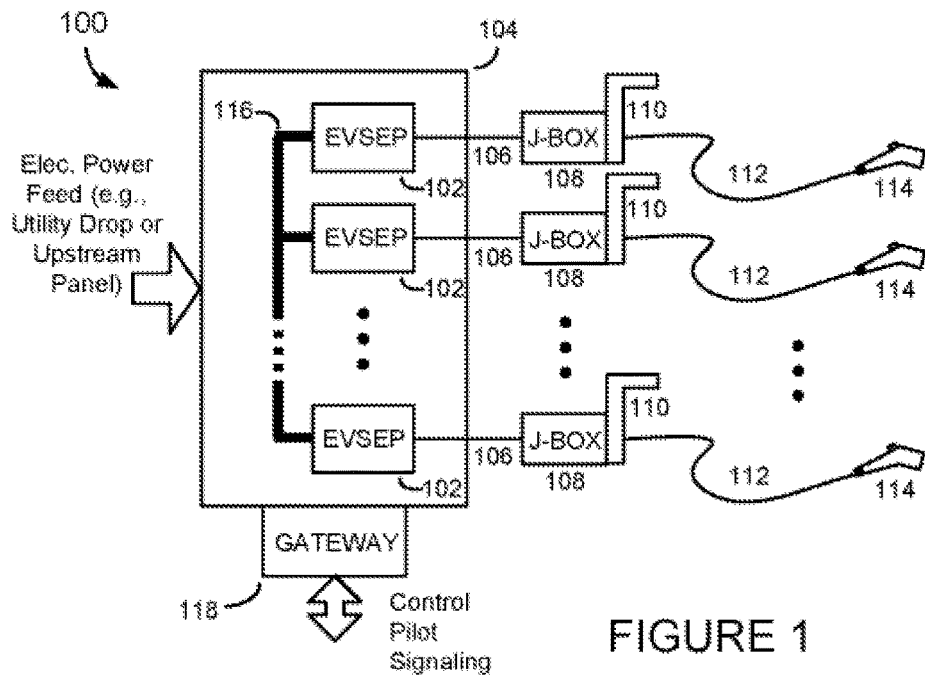
FIG. 1 is a block diagram of an electric vehicle (EV) charging system, according to an embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Referring to FIG. 1, there is shown an electric vehicle (EV) charging system 100, according to one embodiment of the present disclosure. The electric vehicle charging system 100 comprises a plurality of Electric Vehicle Supply Equipment units (also referred to as "EV supply equipment units" and "EVSEPs 102" in the detailed description that follows) electrically connected and configured within an EVSEP electrical distribution panel 104 (referred to as the "EVSEP panel 104" below). The electric vehicle charging system 100 further comprises electrical power distribution cables 106, junction boxes ("J-boxes") 108 located in the general vicinity of a plurality of associated charging stations 110, and plug-in charging cables 112. The electrical power distribution cables 106 distribute electrical power from the various EVSEPs 102 to the plurality of J-boxes 108 and associated charging stations 110, thereby providing a plurality of charging current sources for plug-in electric vehicles (PEVs) that connect to (i.e., "plug into") the charging stations 110.

Each EVSEP 102 of the EV charging system 100 serves two primary purposes. First, each EVSEP 102 controls the maximum allowable charging current its associated charging station 110 is allowed to supply to a connected PEV at any given time. Second, each EVSEP 102 provides circuit protection to its associated charging station 110 and connected PEV, based on the maximum allowable charging current. The circuit protection and charge control functions provided by the EVSEPs 102 are self-operating, i.e., require no human interaction, and are both dynamically adjustable, individually and collectively, in other words, are adjusted in real time as PEVs connect to and from the charging stations 110. Prior art electric vehicle charging systems, in contrast, employ primitive vehicle supply equipment (EVSE) that lack these capabilities. Consequently, if an EV charging system facility provides, say, ten charging stations at 50 A each, the power distribution infrastructure for the facility must be constructed so that all charging stations are capable of supplying the full 50 A, all at the same time, even though all EVSEPs using the full 50 A all at the same time is unlikely or rarely to occur. In other words, the EV charging system facility must be constructed using oversized components, including heavy gauge wires and cables, and must include line-side power distribution infrastructure that is capable of, at any one time, sinking 500 A from the utility grid. Not only is the oversized infrastructure expensive to implement, it results in safety concerns, particularly in circumstances where consumers with PEVs having low-capacity battery packs, in need of relatively low charging currents, must connect to and charge from a high-current/high-voltage charging station. Conventional EVSE also does not typically provide any circuit protection to its charging stations and connected PEVs, relying instead entirely on the PEV's battery management system for circuit protection and/or on electromechanical circuit breakers located external to the EV charging system to provide the circuit protection. Any circuit protection that is provided is static, i.e., is not dynamically adjustable. The EV charging system 100 of the present disclosure avoids these problems, not only because the EVSEPs 102 have built-in circuit protection capabilities but also by virtue of the fact that the circuit protection and charge control functions provided by the EVSEPs 102 are dynamically adjustable, both individually and collectively. To emphasize these attributes and the various other advantages the EVSEPs 102 of the present disclosure have over conventional EVSEs, the letter "P" is appended to the acronym "EVSE" (i.e., EVSEP 02) in the description of the exemplary embodiments of the present disclosure described herein—the "P" signifying the "Plus" capabilities the EVSEPs 102 have compared to conventional EVSEs, including the EVSEPs' dynamically adjustable circuit protection and dynamically adjustable charge control and charge allocation capabilities.

The EVSEP panel 104 is configured to receive electrical power from the utility grid (e.g., at a utility service drop) or, alternatively, from another upstream EVSEP panel or upstream conventional panel. In accordance with one embodiment of the present disclosure, the EVSEP panel 104 further includes an EVSEP communications bus 116 (for example, a controller area network (CAN) bus or an inter-integrated circuit (I²C) bus) and a gateway 118 that is communicatively coupled to the EVSEPs 102. The MCUs 202 (see FIG. 2) of the EVSEPs 102 are configured and programmed to communicate with one another over the EVSEP communications bus 116 and, among other things, to assess, compute and, when necessary, apportion the total supply current supplied by EVSEP panel 104 among the various charging stations 110. The gateway 118 serves to distribute control pilot signals from the EVSEPs 102 to handles 114 of the charging cables 112 located at the charging stations 110, e.g., via the J-boxes 108, and the control pilot signals are used to negotiate the charging currents supplied from the charging stations 110 to their connected PEVs, as will be described in more detail below.

Figure 2:
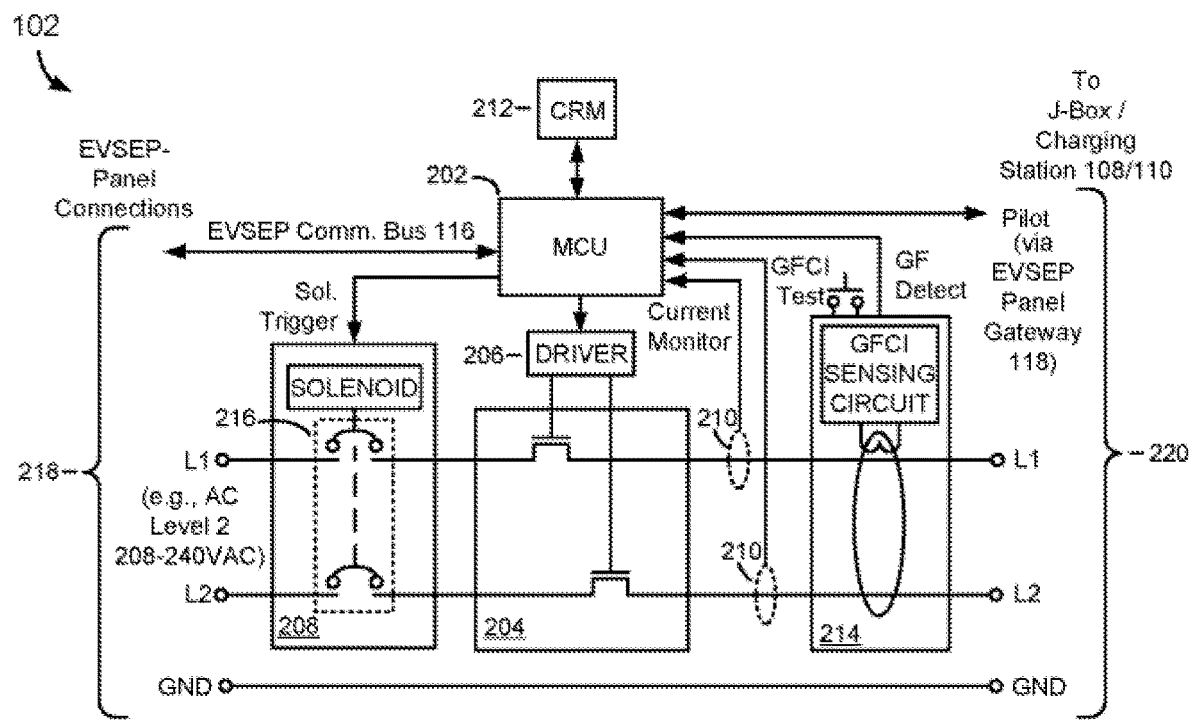
FIG. 2 is a drawing illustrating the salient components of an EV supply equipment unit (EVSE) or "EVSEP," according to an embodiment of the present disclosure.

FIG. 2 is a block diagram of one of the EVSEPs 102 employed in the EV charging system 100, highlighting its principal components. The principal components include: a microcontroller unit (MCU) 202; a bi-directional solid-state switch 204; a driver circuit 206, which controls whether the bi-directional solid-state switch 204 is ON (closed) or OFF (open); an air gap disconnect unit 208 that provides a physical separation between line and load, otherwise known as disconnect or lockable disconnect; Hall Effect sensors 210 or other current-sensing technology; computer readable memory (CRM) 212; and a ground-fault circuit interrupter (GFCI) 214. The bi-directional solid-state switch 204 comprises one or more power semiconductor devices connected in series with a closeable air gap 216 of the air gap disconnect unit 208, between input (line-side) terminals 218 and output (load-side) terminals 220. The input terminals 218 are electrically connected to hot bus bar, neutral, and ground connections in the EVSEP panel 104, and the output terminals 220 are electrically connected to electrical power distribution cables or wires 106, which, as explained above, serve to distribute electrical power from each EVSEP 102 to its associated J-Box 108 and charging station 110. In a preferred embodiment of the present disclosure the one or more bi-directional power semiconductors forming the bi-directional solid-state switch 204 comprise(s) one or more or more silicon carbide (SiC) metal-oxide-semiconductor field-effect transistors (MOSFETs). However, other types of power semiconductor devices can be used, as will be appreciated by those of ordinary skill in the art.

The CRM 212 in each of the EVSEPs 102 comprises flash memory and/or electrically erasable programmable read-only memory (EEPROM) for storing the computer program instructions, and random-access memory (RAM), which the EVSEP's MCU 202 uses to perform the various operations specified by the computer program instructions. The CRM 212 may be entirely external to the MCU 202 (as depicted in FIG. 2), embedded entirely within the MCU 202, or may be partly external to the MCU 202 and partly integrated within the MCU 202, as will be appreciated and understood by those of ordinary skill in the art. Among other things, the computer program instructions include instructions that provide the MCU 202 in each EVSEP 102 the ability to set, control, and adjust the circuit protection settings of provided by the EVSEP 102 and instructions that provide the MCUs 202 the ability to set, control, and adjust how much charging current is allowed to flow through the EVSEP 102 to its associated charging station 110.

Under the control of its MCU 202 the bi-directional solid-state switch 204 in each EVSEP 102 determines whether charging current is allowed to flow to the EVSEP's associated charging station 110. As explained in further detail below, when the bi-directional solid-state switch 204 in a given EVSEP 102 is switched ON and the EVSEP's air gap disconnect unit 208 is closed (in embodiments of the EVSEP that utilize an air gap disconnect unit 208), charging current is able to flow through the solid-state switch 204 and closed air gap 216 of the air gap disconnect unit 208, to the EVSEP's associated charging station 110, and ultimately to a PEV connected to (i.e., plugged into) the charging station 110, via associated J-box 108 and charging cable 112. However, upon the EVSEP's MCU 202 determining, with the aid of measurements taken by its Hall effect sensors 210, that a short circuit is present in the EVSEP's 102's load circuit, the MCU 202 directs the driver circuit 206 in the EVSEP 102 to switch the bi-directional solid-state switch 204 OFF, as soon as it is possible. It also generates a solenoid trigger signal that triggers a solenoid in the air gap disconnect unit 208 to open the air gap 216 and thereby isolate the charging station 110 and PEV and prevent any additional current from flowing to the associated charging station 110. By employing solid-state switches 204 in the EVSEPs 102, the EVSEPs 102 are able to isolate short circuits over a thousand times faster than conventional electromechanical circuit breakers. There are various ways in which the air gap disconnect unit 208 in the EVSEPs 102 can be designed to trigger and various ways in which EVSEPs' bi-directional solid-state switches 204 can be controlled to switch ON and OFF (e.g., entirely hardware controlled or hardware and software controlled). Some examples of how the EVSEPs 102 may be adapted to perform these functions can be found in commonly owned U.S. Pat. No. 10,541,530 and co-pending and commonly assigned U.S. patent application Ser. No. 16/898,538, now U.S. Pat. No. 11,322,916, both of which patents are incorporated herein by reference.

Figure 3:
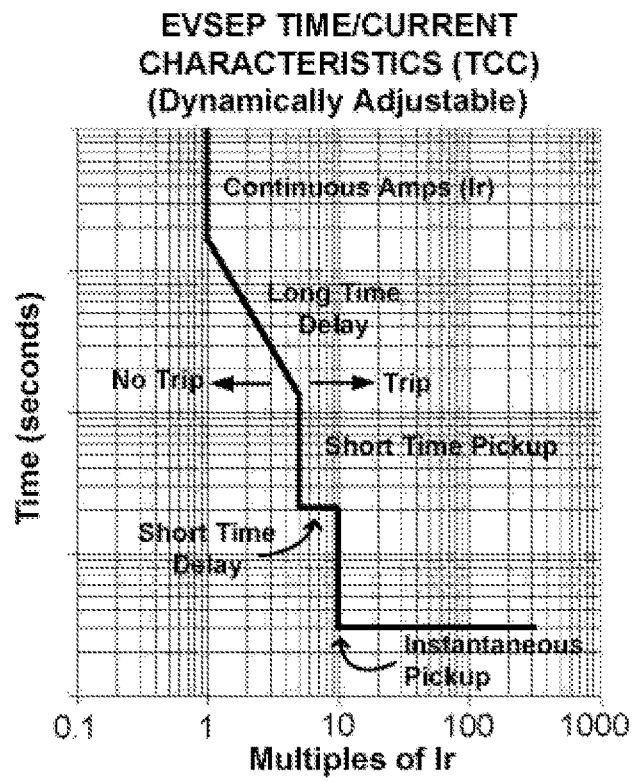
FIG. 3 is a drawing depicting an exemplary time-current characteristic (TCC) curve according to which an EVSEP can be configured and controlled to operate, including various dynamically adjustable circuit protection attributes.

In one embodiment of the present disclosure the MCUs 202 and bi-directional solid-state switches 204 in the EVSEPs 102 not only provide short-circuit protection to the charging stations 100 and connected PEVs but the MCU 202 and bi-directional solid-state switch 204 in each EVSEP 102 also provides overcurrent protection and is configured and controlled by its associated MCU 202 to operate according to a dynamically adjustable time-current characteristic (TCC) curve, for example, as illustrated in FIG. 3. The computer program instructions (e.g., firmware) stored in the CRM 212 of each EVSEP 102 provides the MCU 202 the ability to set, control, and adjust any one or more of the various circuit protection attributes of the TCC curves, including, but not limited to: the EVSEP's continuous current rating Ir, long-time delay and short-time delay trip settings, short time pickup current, and instantaneous pickup current. In a preferred embodiment of the present disclosure the computer program instructions further include instructions that provide the MCU 202 in each EVSEP 102 the ability to communicate in real time with the MCUs 202 of other EVSEPs 102 in the EVSEP panel 104, over the EVSEP communications bus 116, and instructions that provide the MCU 202 in a given EVSEP 102 the ability to adjust the TCC curve of its respective bi-directional solid-state switch 204, dynamically and in real time, depending on the magnitudes of the currents that are currently allocated to other charging stations 110 and associated PEVs via other EVSEPs 102 in the EV charging system 100 (or depending on the magnitudes of the maximum allowable charging currents I_CHARGE currently set by the EVSEPs 102) and/or depending on changes (increases or decreases) in the magnitudes of the allocated currents (or depending on changes (increases or decreases) in the magnitudes of the maximum allowable charging currents I_CHARGE).

Figure 4:
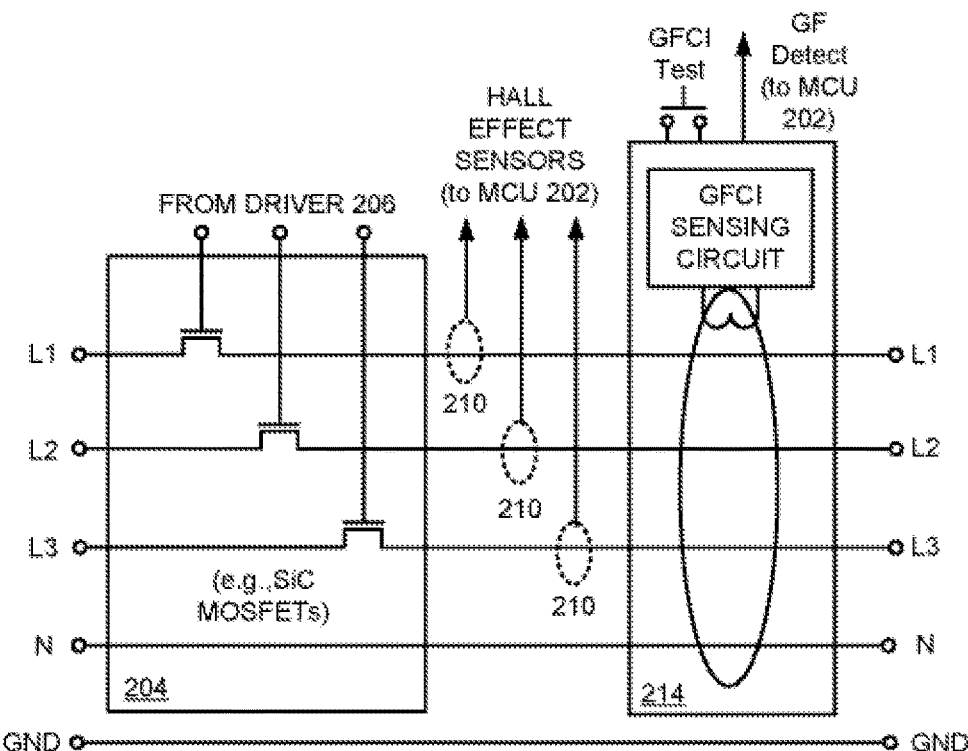
FIG. 4 is a drawing depicting the principal components of a three-phase embodiment of an EVSEP, according to an embodiment of the present disclosure.

The EVSEP 102 depicted in FIG. 2 can be easily modified to be a three-phase EVSEP, for use in a three-phase EV charging system. As illustrated in FIG. 4, the three-phase embodiment of the EVSEP 102 has three current carrying conductors (L1, L2, L3), instead of just two L1 and L2, and a three-phase bi-directional solid-state switch. Although not shown in the drawing, the three-phase embodiment of the EVSEP also includes, preferably though not necessarily, a modified air gap disconnect unit with a closeable air gap in all three lines L1, L2, and L3.

It should be mentioned that whereas the exemplary embodiment of the EVSEP 102 described herein and depicted in FIG. 2 and other drawings of this disclosure includes air gap disconnect unit 208, in other embodiments of the present disclosure the EVSEP 102 does not include an air gap disconnect unit but rather relies solely on the bi-directional solid-state switch 204 to provide fault and overcurrent protection. Including the air gap disconnect unit 208 is preferable in most circumstances and applications, however, since it isolates the EVSEP's 102's charging station 110 and associated PEV from the rest of the EV charging system 100 when a fault or other potentially hazardous situation occurs.

Figure 5A:
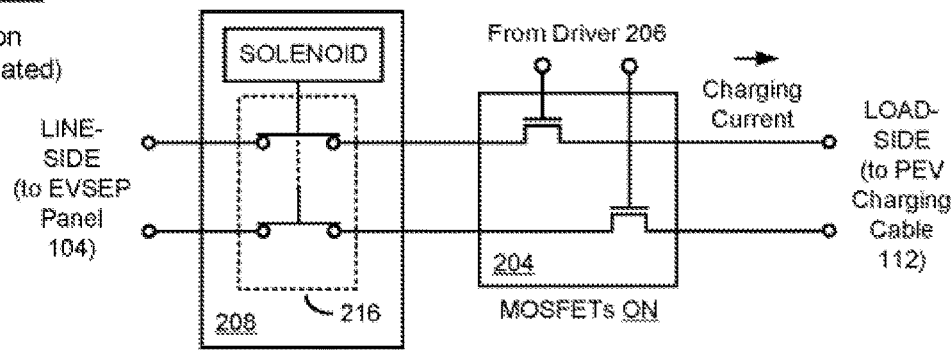
FIG. 5A is a drawing depicting how the bi-directional solid-state switch and air gap disconnect unit of an EVSEP are configured when the EVSEP is in an "ON" state.
Figure 5B:
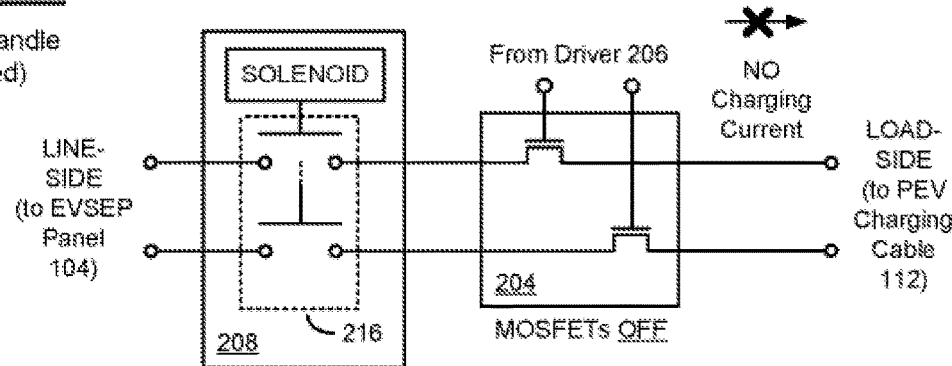
FIG. 5B is a drawing depicting how the bi-directional solid-state switch and air gap disconnect unit of an EVSEP are configured when the EVSEP is in an "OFF" state.
Figure 5C:
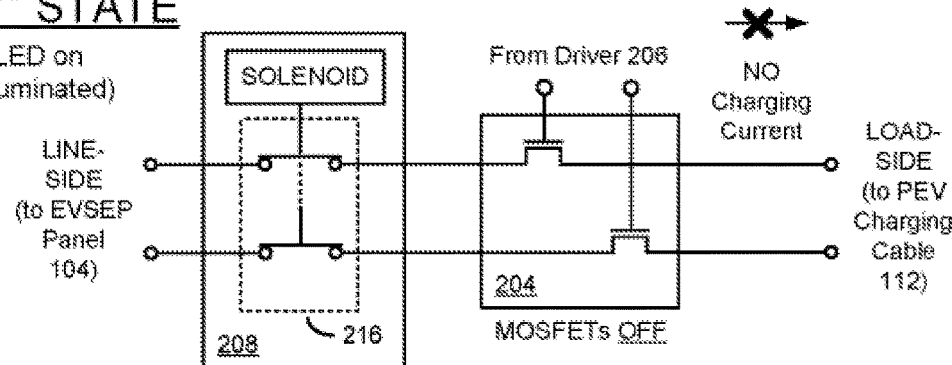
FIG. 5C is a drawing depicting how the bi-directional solid-state switch and air gap disconnect unit of an EVSEP are configured when the EVSEP is in a "STANDBY" state.

At any given time during operation of the EV charging system 100, each EVSEP 102 in the EVSEP panel 104 is configured in one of three possible states: an "ON" state, an "OFF" state, or a "STANDBY" state. These three states are illustrated in FIGS. 5A-5C. When in the "ON" state (FIG. 5A), the air gap disconnect unit 208 is configured so that the air gap 216 is closed and the bi-directional solid-state switch 204 is ON. It is only in this "ON" state that the EVSEP 102 allows charging current to flow to its associated charging station 110 and connected PEV. During charging, the charging current supplied from the EVSEP panel 104 flows through the associated EVSEP 102 (i.e., through the closed air gap 216 of the air gap disconnect unit and the ON bi-directional solid-state switch 204), through corresponding electrical power distribution cables 106, charging cable 112, J-Box 108, and charging station 110, and finally to the battery charger located in the PEV connected to the associated charging station 110. Each EVSEP 102 in the EVSEP panel 104 is configured to protect an associated load circuit containing the charging station 110 and plugged-in PEV, and will transition to the OFF state if the EVSEP 102 detects a short circuit in the electrical power distribution cables 106, charging cable 112, J-Box 108, charging station 110, or plugged-in PEV. As will be become more clear from the description that follows, the EVSEPs 102 also transition rapidly back and forth between the ON and STANDBY, as source and load conditions change, allowing the MCUs 202 in the EVSEPs 102 to dynamically adjust, individually and collectively, the maximum allowable charging currents their respective charging stations 110 can draw.

An EVSEP 102 will be configured in the "ON" state only if: 1) the PEV is properly plugged into the associated EVSEP's 102's charging station (as verified, for example, by a proximity check performed by and between the charging station's charging cable handle 114 and PEV), and 2) the EVSEP's MCU 202 has completed negotiating and setting a maximum allowable charging current for the PEV. Once those criteria are satisfied and the PEV commences charging, the EVSEP's MCU 202 continuously monitors the charging current based on measurements taken by the EVSEP's 102's Hall effect sensors 210. As charging progresses, the EVSEP's MCU 202 communicates with the MCUs 202 in all other EVSEPs in the EV charging system 100 that are distributing charging currents to their respective charging stations 110, via the EVSEP communications bus 116, and repeatedly and continuously calculates and re-calculates the amount of EVSEP panel 104 supply current that is available for supply to the EVSEP's associated charging station 110, as will be described in more detail below.

FIG. 5B shows the configuration of an EVSEP 102 when in the OFF state. An EVSEP 102 will transition to the OFF state in the unlikely and unfortunate event of a fault (e.g., short circuit) occurring in the EVSEP's load circuit, or if for some reason the EVSEP 102 is unable to adjust its charge control settings in a manner that allows charging current to flow to its connected PEV. These anomalies will be detected or determined by the EVSEP's MCU 202, with the aid of the EVSEPs Hall effect sensors 210, and upon being detected or determined the EVSEP's MCU 202 will direct the driver circuit 206 to switch the bi-directional solid-state switch 204 OFF, as soon as it is possible, and will also generate a solenoid trigger signal that triggers the solenoid in the air gap disconnect unit 208 to open the air gap 216, as previously described.

The third and final state that the EVSEPs 102 can be configured in is the "STANDBY" state (see FIG. 5C). The STANDBY state may be thought of as the default state, since it is the state EVSEPs 102 remain in while waiting for PEVs to connect to their associated charging stations 110. It is also the state that an EVSEP 102 temporarily transitions to after a PEV has already commenced charging, upon the EVSEP 102 determining that it is necessary or desired to dynamically adjust its charge control and/or circuit protection settings. When a PEV plugs into one of the charging stations 110, the EVSEP 102 associated with that charging station 110 verifies that the PEV is properly plugged in (for example, as verified by a proximity check performed between the charging station's charging cable handle 114 and PEV's charge controller). After the PEV has properly plugged in, the PEV requests a desired charging current I_REQ from the EVSEP 102, according to a control pilot procedure that may or may not be standardized. The EVSEP's MCU 202 then either honors the request or negotiates a lower charging current if, for example, the current available for supply from the EVSEP panel 104 is insufficient to meet the request. In either event, once the EVSEP 102 and PEV have negotiated a maximum allowable charging current I_CHARGE, the EVSEP's MCU 202 then adjusts the circuit protection it provides based on the negotiated maximum allowable charging current I_CHARGE. In one embodiment of the present disclosure the MCU 202 in each EVSEP 102 is configured to adjust the EVSEP's circuit protection continuous current rating Ir based on the negotiated maximum allowable charging current I_CHARGE (for example, Ir=125% of I_CHARGE, where Ir equals long-time pick-up, or LTPU) and the bi-directional solid-state switch 204 in each EVSEP 102 is controlled to provide overcurrent protection at the LTPU current point, similar to what is depicted in FIG. 3.

From the foregoing description it should be clear that the maximum allowable charging current I_CHARGE set by an EVSEP 102 is not static. Rather, it varies and is dynamically adjusted by the EVSEP's MCU 202 over time. At any given time the current available for supply I_AVAIL to any given EVSEP 102 depends both on the total current supply I_SUPP available from the EVSEP panel 104 and the sum of all currents allocated to the EVSEPs 102 ($I_1+I_2+I_3+\ldots$) in the EV charging system 100. In other words, I_AVAIL=I_SUPP−($I_1+I_2+I_3+\ldots$). As will be explained in more detail below, the EV charging system 100 adjusts the allocated currents ($I_1+I_2+I_3+\ldots$) as PEVs plug into the charging stations 100 to charge and as PEVs complete charging and unplug from the charging stations 110. The MCUs 202 in the EVSEPs 102 communicate and coordinate with one another over the EVSEP communications bus 116 to determine how and when adjustments to the allocated currents ($I_1+I_2+I_3+\ldots$) are needed or desired, and the EVSEPs 102 dynamically adjust their maximum allowable charging currents I_CHARGE in response to changes made to the allocated currents ($I_1+I_2+I_3+\ldots$). Note that in most circumstances each EVSEP 102 will utilize the full amount of current allotted to it, in other words, will dynamically adjust its maximum allowable charging current I_CHARGE to match the full amount of current allocated to it (but not necessarily in all circumstances).

In addition to the circuit protection provided by the bi-directional solid-state switches 204, each of the EVSEPs 102 further includes a ground-fault circuit interrupter (GFCI) 214. The GFCI 214 comprises a differential current transformer and GFCI sensing circuit that continuously monitors the currents flowing through the current carrying conductors L1 and L2 conductor. Any detected imbalance in the two currents is indicative of a possible ground fault (GF). Accordingly, when an imbalance is detected, the GFCI sensing circuit sends a GF detect signal to the EVSEP's 102's MCU 202, which then responds as quickly as possible to transition the EVSEP 102 to the OFF state (by triggering the air gap disconnect unit 208 to disengage and open the air gap 216 and directing the driver circuit 206 to switch the bi-directional solid-state switch 204 OFF, as previously described). It is also acceptable not to open the air gap 216 and only to turn the bi-directional solid-state switch 204 off. It should be mentioned that some conventional (prior art) EVSEs are also equipped with some sort of GFCI capability. However, GFCI protection in conventional EVSEs is only operable when the charging cable is plugged into the PEV. In contrast, the EVSEPs 102 of the present disclosure have the ability to detect and isolate ground faults both when the charging cable 112 is plugged into the PEV and when the charging cable 112 is unplugged. The additional ability to detect and respond to ground faults when the charging cable 112 is unplugged from the PEV follows from the EVSEP's 102's ability to detect leakage currents flowing through its bi-directional solid-state switch 204 when the EVSEP 102 is in the STANDBY state (the state the EVSEP 102 is nominally in when not electrically connected to a PEV). The additional ground fault protection provided by the EVSEP 102 is a significant safety feature since during use the charging cable 112 can weaken to the point that one of its conductors becomes exposed (e.g., due to aging, normal wear and tear, or because of being run over by a vehicle). The exposed conductor creates a shock hazard condition that the associated EVSEP's GFCI 214 has the ability to detect as a ground fault, even when the charging cable 112 is unplugged and stored on the associated charging station's 110's pedestal. Accordingly, once the GFCI 214 detects the fault condition, the EVSEP 102 transitions as quickly as possible from the STANDBY state to the OFF state, to prevent any further usage of the charging cable 112 and associated charging station 110.

Figure 6A:
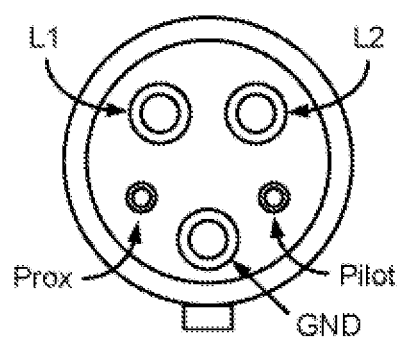
FIG. 6A is a face view drawing of a connector portion of an alternating current (AC) charging cable handle that can be employed at a charging station in the EV charging system depicted in FIG. 1, according to one embodiment of the present disclosure.
Figure 6B:
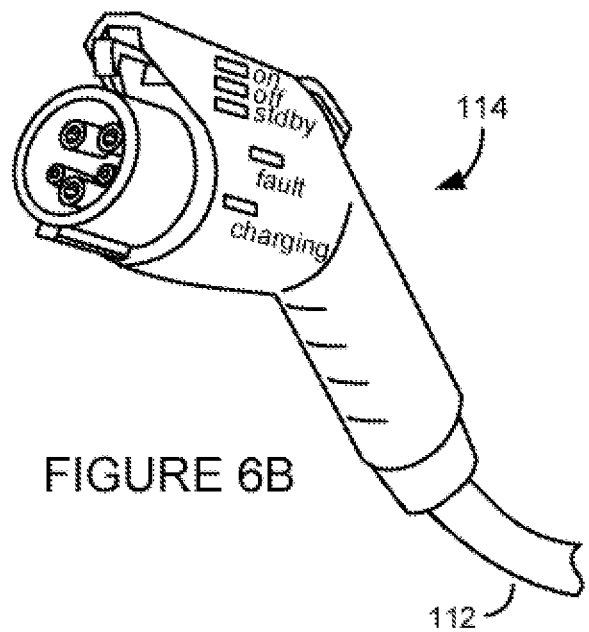
FIG. 6B is a perspective view drawing of an AC charging cable handle that can be employed at a charging station in the EV charging system depicted in FIG. 1, according to one embodiment of the present disclosure.

In one embodiment of the present disclosure the EV charging system 100 and EVSEPs 102 are designed so that they are compliant with the SAE J1772 ("J Plug") standard, support AC Level 2 charging, and utilize an AC charging connector having L1, L2, GND, and control pilot pins similar to as illustrated in FIG. 6A. Additionally, in one embodiment of the present disclosure (see FIG. 6B) the handles 114 of the charging cables 112 include light-emitting diodes (LED) that indicate the current status of the charging station 110 and associated EVSEP 102: for example, one or more of: ON (green LED), STANDBY (yellow LED), and OFF (red LED), and in another embodiment of the present disclosure also or alternatively include an LED indicator that indicates the charging station 110 is currently supplying charging current to a connected PEV (or conversely, indicating that charging has completed), and an LED indicator that cautions users of a possible fault condition. It should be mentioned that whereas the connector pins in the exemplary handle 114 depicted in FIG. 6B are designed to comply with the SAE J1772 standard, the handle 114, EVSEPs 102 and the EV charging system 100 overall should not be construed as being restricted to any given EV charging standard, as they can be easily adapted to comply with essentially any EV charging standard. Accordingly, the present disclosure should not be construed as being restricted to any particular standard, unless specifically recited in the appended claims.

While including LED indicators on the handle 114 of the charging cable 112 is useful, one or more of the LED indicators can be alternatively (or additionally) mounted in or on pedestals or other equipment at or near the charging stations 110. Electronic displays can also be mounted in or on the charging stations pedestals (or in or on other nearby equipment), and in one embodiment of the present disclosure the CRM 212 in the EVSEPs 102 includes computer program instructions that provide the EVSEPs' MCUs 202 the ability to estimate charging times for PEVs that plug into the charging stations 110, for example, based on the charging currents the EVSEPs 102 supply and battery pack capacities of the PEVs, and display in real time (i.e., as the PEVs charge) estimated times to complete charging on the electronic display.

Figure 7:
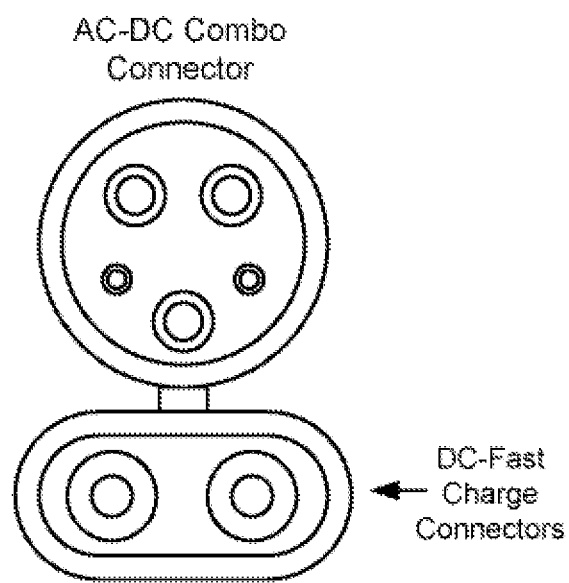
FIG. 7 is a face view drawing of a connector portion of an AC and fast direct current (DC) "combo" connector that can be employed in the EV charging system depicted in FIG. 1, according to one embodiment of the present disclosure.

The exemplary embodiments of the present disclosure described and illustrated above facilitate AC charging. In other embodiments of the present disclosure the EV charging system 100 is equipped with EVSEPs 102 that have been adapted to supply both AC and DC charging currents, depending on the PEV's needs, in which case an AC and fast DC "combo" connector having a handle/plug with pins similar to that depicted in FIG. 7 is employed. In other embodiments of the present disclosure, the EVSEPs are configured to supply only DC currents, in which case a DC-only type connector may be used.

Referring now to FIGS. 8A-8D, there is shown a flowchart illustrating a charge control and circuit protection method 800 that one of the EVSEPs 102 performs, in accordance with one embodiment of the present disclosure. The exemplary method 800 illustrates and highlights the dynamic circuit protection and dynamic charge control functions the EVSEP 102 performs while operating in the context of the EV charging system 100. At the "START" of the method 800 it is assumed that a PEV has already properly connected to the EVSEP's 102's charging station 110 (e.g., as confirmed by passing a J1772 proximity check performed by and between the charging cable handle 114 and PEV charge controller) and further assumed that the EVSEP 102 is in the STANDBY state and ready to supply charging current to the charging station 110 and connected PEV.

At first step 802 (see FIG. 8A), after detecting that the PEV has connected to the charging station 110, the associated EVSEP 102 begins transmitting a control pilot signal to the PEV's charge controller, via the EVSEP panel gateway 118 and through the associated charging station 110 and charging cable 112. For example, if the SAE J1772 standard is being followed, the control pilot signal is a +12 VDC signal, and the MCU 202 of the EVSEP 102 determines that the PEV has connected by detecting and measuring a voltage drop across a resistor divider formed between the connected handle 114 and PEV charge controller. The PEV charge controller responds to the control pilot with a charging current request I_REQ. For example, if the SAE J1772 standard is being followed, the PEV charge controller changes a resistance of one of the resistors in the charge controller, resulting in an additional voltage drop detected by the EVSEP 102 indicative of the charging current request I_REQ. At step 804, the EVSEP's MCU 202 detects the charging current request I_REQ. Then, at step 806 the EVSEP's 102's MCU 202 calculates the current available for supply I_AVAIL from EVSEP panel 104 to the EVSEP 102, i.e., I_AVAIL=I_SUPP−($I_1+I_2+I_3+\ldots$), as previously described. Next, at decision 808, the EVSEP's 102's MCU 202 determines whether the current available for supply I_AVAIL is sufficient to fulfill the PEV's charging current request I_REQ. If the MCU 202 determines that I_AVAIL ≥ I_REQ, in other words that sufficient supply current is available ("YES" at decision 808), the method 800 continues at step 810 (see FIG. 8B). At step 810 the EVSEP 102 then honors the PEV's charging current request and sets the maximum allowable charging current to: I_CHARGE=I_REQ. Then, based on the I_CHARGE=I_REQ, at step 812 the EVSEP 102 adjusts the circuit protection settings of its bi-directional solid-state switch 204 accordingly. On the other hand, if the MCU 202 determines that I_AVAIL<I_REQ, in other words that insufficient supply current is available ("NO" at decision 808), the method 800 branches to step 838 to determine an I_CHARGE<I_REQ and the circuit protection settings for the EVSEP's bi-directional solid-state switch 204 are set accordingly (see FIG. 8D, described in detail below).

Assuming that the EVSEP 102 honors the PEV's charging request at step 810 and has set the maximum allowable charging current to I_CHARGE=I_REQ at step 812, before transitioning from the STANDBY state to the ON state and commencing charging, at decision 814 the EVSEP's GFCI 214 performs a ground fault check. If the ground fault test fails ("NO" at decision 814), the method 800 ends and the PEV is not permitted to commence charging. On the other hand, if the ground fault test passes ("YES" at decision 814), indicative of no ground fault present, at step 816 the EVSEP 102 transitions from the STANDBY state to the ON state and begins supplying current to the PEV, according to I_CHARGE=I_REQ and the circuit protection settings of the bi-directional solid-state switch 204 previously set by the EVSEP 102 based on I_CHARGE=I_REQ.

As the PEV charges, the MCU 202 of the associated EVSEP 102 communicates with the MCUs 202 in the other EVSEPs 102 in the EV charging system 100, over the EVSEP communications bus 116, and constantly monitors and continually recalculates the available supply current I_AVAIL. So long as there is no change in I_AVAIL ("NO" at decision 818), the PEV continues charging according to the previously set I_CHARGE and according to the circuit protection settings previously set by the EVSEP 102, as indicated by step 820. As the PEV continues charging, the EVSEP 102 also continues to monitor the charging progress, as indicated by decision 822. If the EVSEP's MCU 202 determines, either by itself or in response to a "charging complete" notification from the PEV, that the PEV has completed charging ("YES" at decision 822), the EVSEP 102 transitions to the STANDBY state and the method 800 ends. However, if the EVSEP's MCU 202 determines that charging has not completed ("NO" at decision 822), at step 826 the EVSEP's MCU 202 recalculates the current available for supply I_AVAIL once again, and at decision 818 queries again whether an adjustment to the maximum allowable charging current I_CHARGE is required. (It should be mentioned that, although not reflected precisely in the flowchart, the calculation in step 826 is preferably, though not necessarily, performed repeatedly and continuously in the background as the EVSEP 102 operates, from the time the PEV plugs into the charging station 110 until charging is completed.) If the EVSEP's MCU 202 ascertains no change in I_AVAIL ("NO" at decision 818), at step 820 charging is allowed to continue according to the previously set maximum allowable charging current I_CHARGE and previously-set circuit protection settings. However, if the EVSEP's MCU 202 determines that I_AVAIL has in fact changed ("YES" at decision 818), the method 800 continues at decision 826 in FIG. 8C.

There are a number of reasons why the current available for supply I_AVAIL to the EVSEP 102 might change. For example, I_AVAIL may decrease due to another PEV plugging into one of the charging stations 110 or may increase due to another PEV completing charging and unplugging from its charging station 110. I_AVAIL may also decrease or increase due to an increase or decrease in the available supply current fed to the EVSEP panel 104 or in response to a charge distribution rule imposed by a rules-based charge allocation algorithm (described in more detail below). Accordingly, if the EVSEP's MCU 202 determines that I_AVAIL has in fact changed ("YES" at decision 818), the method 800 continues in FIG. 8C and at decision 826 the EVSEP's MCU 202 then determines whether I_AVAIL has increased or decreased. If the EVSEP's MCU 202 determines that the current available for supply I_AVAIL to the EVSEP 102 has increased ("↑" at decision 826), the method 800 continues at step 828. On the other hand, if the EVSEP's MCU 202 determines that the current available for supply I_AVAIL has decreased ("↓" at decision 826), the method 800 continues at step 838 in FIG. 8D.

Assuming that the EVSEP's MCU 202 has determined that the current available for supply I_AVAIL has increased ("↑" at decision 826), the EVSEP's MCU 202 determines whether the maximum allowable charging current I_CHARGE was previously already set to I_CHARGE=I_REQ (at step 810 above) or was set to a value less than I_REQ, i.e., I_CHARGE<I_REQ, due to the EVSEP's MCU 202 determining at decision 808 that insufficient current was then available to honor the PEV's charging current request I_REQ. If the EVSEP's MCU 202 determines that I_CHARGE is already set to I_REQ, i.e., that I_CHARGE=I_REQ ("YES" at decision 830), the EVSEP 102 then branches back to step 820 in the flowchart (see FIG. 8B) with the EVSEP 102 configured according to the previously set allocated charge I_CHARGE=I_REQ and previously set circuit protection settings. However, if at decision 830 the EVSEP's MCU 202 determines that I_CHARGE was set to a value less than I_REQ, i.e., was set to I_CHARGE<I_REQ due to the EVSEP's MCU 202 determining at decision 810 that insufficient current was then available to honor the PEV's charging current request I_REQ (see steps FIG. 8D below), at step 832 the EVSEP's MCU 202 increases the maximum allowable charging current from I_CHARGE<I_REQ to I_CHARGE=I_REQ (or to the maximum charging current available), and at step 834 readjusts the circuit protection settings of its bi-directional solid-state switch 204 accordingly. After the EVSEP's 102's maximum allowable charging current has been readjusted to I_CHARGE=I_REQ and its circuit protection settings have been readjusted, at step 836 the EVSEP 102 transitions back to the ON state. Then the method 800 branches back to step 820 in the flowchart (see FIG. 8A) with the EVSEP 102 configured to operate according to the updated (readjusted)

maximum allowable charging current I_CHARGE=I_REQ and updated (readjusted) circuit protection settings.

Figure 8A:
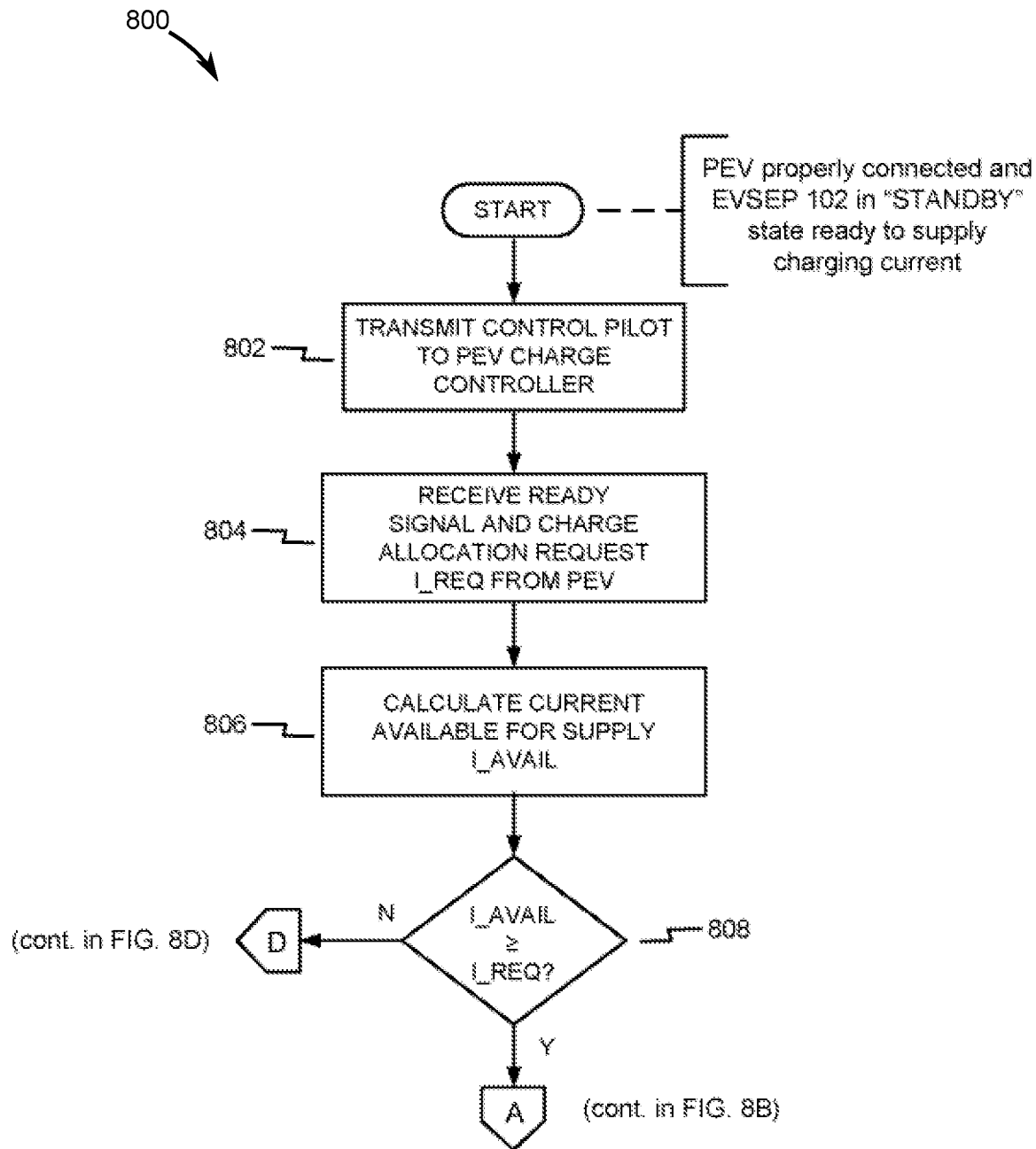
FIG. 8A is a first portion of a flowchart of a charge control and circuit protection method that an EVSEP performs, according to an embodiment of the present disclosure.
Figure 8B:
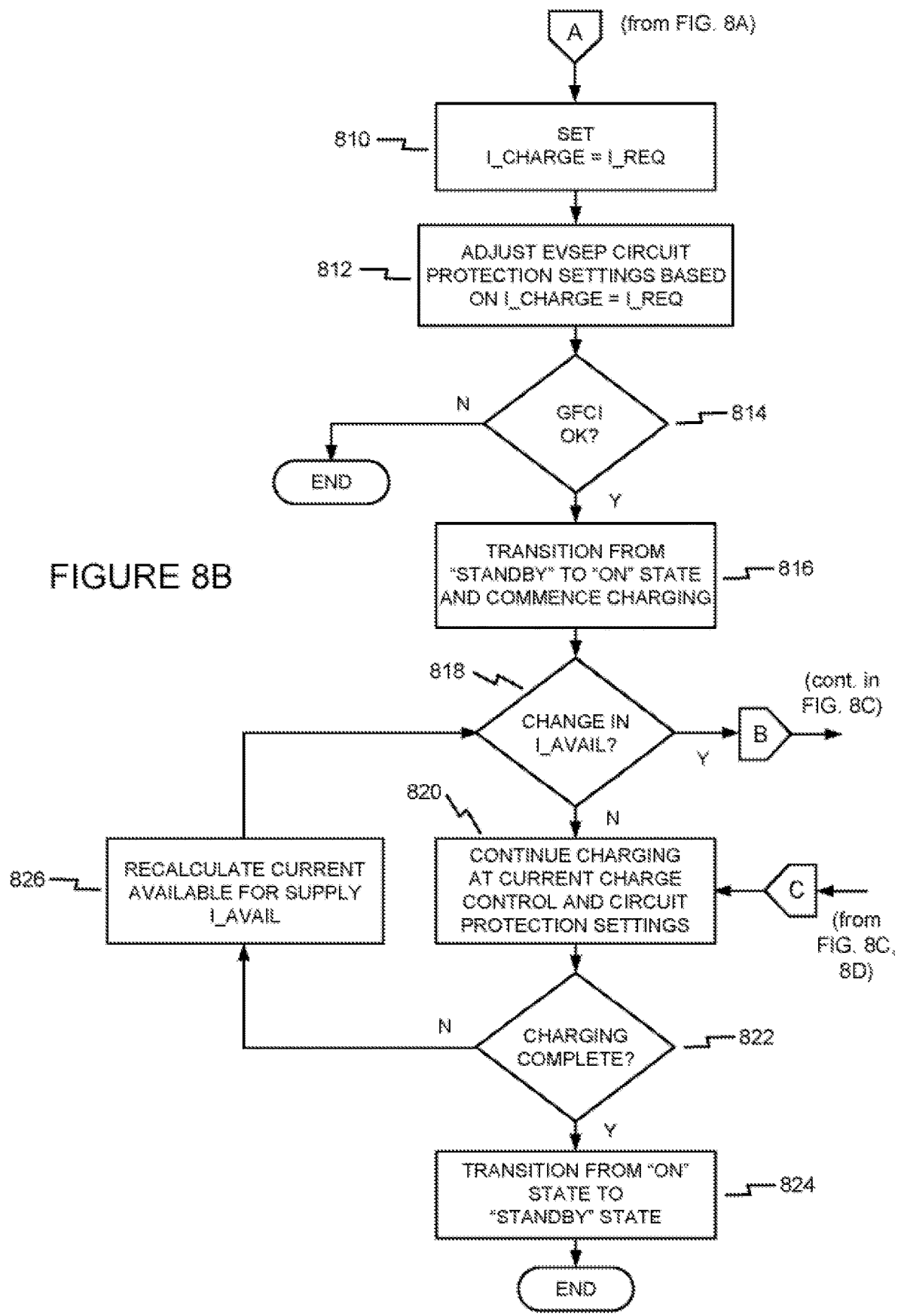
FIG. 8B is a second portion of a flowchart of a charge control and circuit protection method that an EVSEP performs, according to an embodiment of the present disclosure.
Figure 8C:
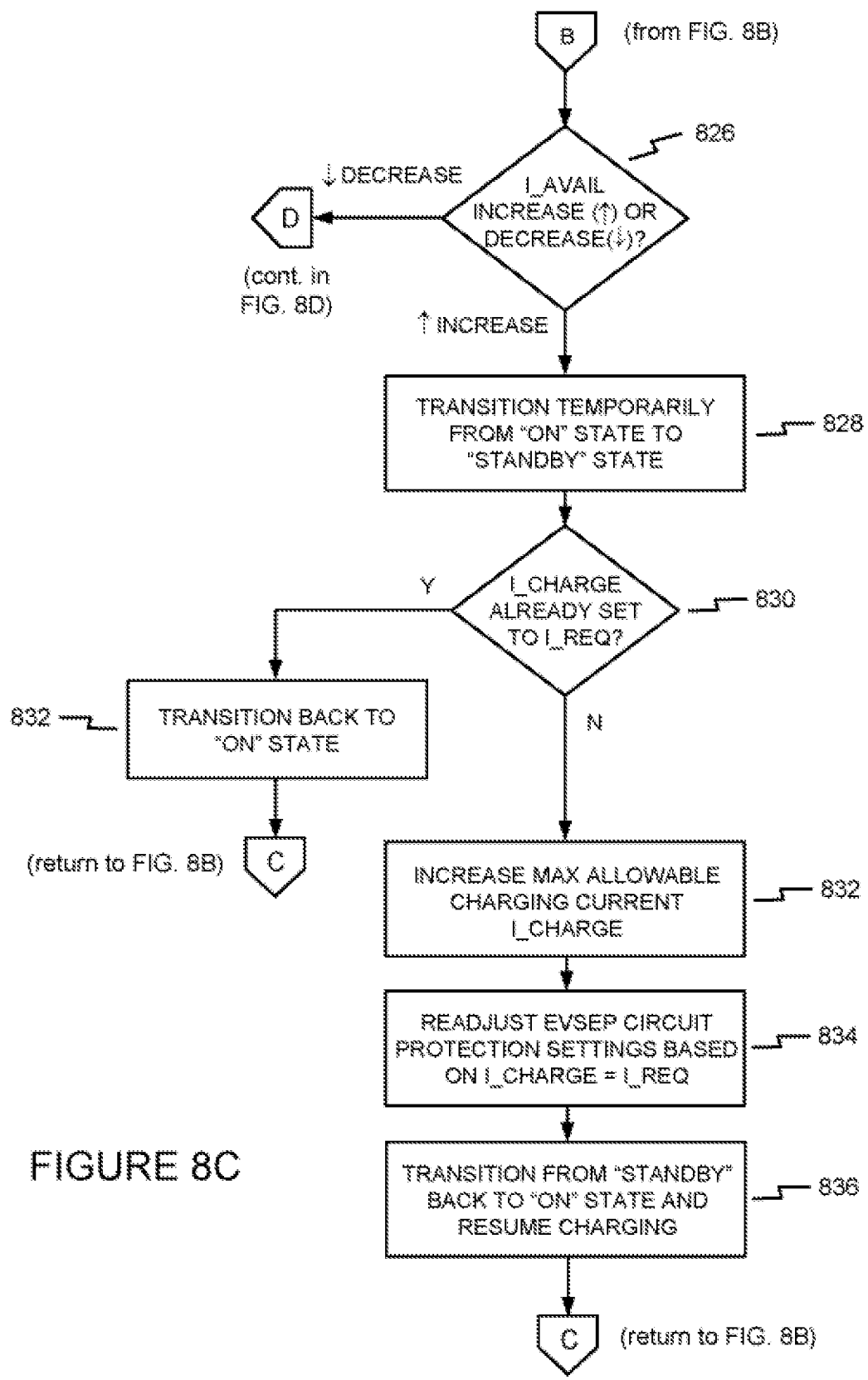
FIG. 8C is a third portion of a flowchart of a charge control and circuit protection method that an EVSEP performs, according to an embodiment of the present disclosure.
Figure 8D:
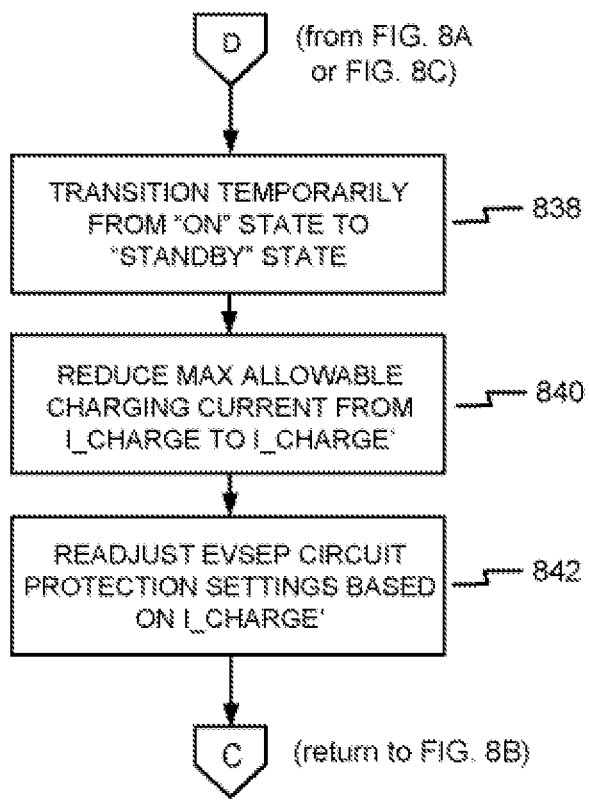
FIG. 8D is a fourth portion of a flowchart of a charge control and circuit protection method that an EVSEP performs, according to an embodiment of the present disclosure.

If the EVSEP 102 has determined at decision 826 that the current available for supply I_AVAIL to the EVSEP 102 has decreased, rather than increased (as discussed in reference to FIG. 8B) or the EVSEP's MCU 202 determines that insufficient current is available to honor the PEV's charging current request I_REQ at decision 808 (during the time the PEV first plugs into the charging station 110), the method 800 continues at step 838 in FIG. 8D, after which, at step 840, specifically, the EVSEP's MCU 202 reduces the maximum allowable charging current from I_CHARGE to I_CHARGE' (I_CHARGE<I_CHARGE≤I_AVAIL) and readjusts its circuit protection settings based on the magnitude of the new maximum allowable charging current I_CHARGE' at step 842. After the EVSEP's 102's maximum allowable charging current I_CHARGE' and circuit protection settings have been readjusted, the method 800 branches back to step 820 in the flowchart (see FIG. 8B) with the EVSEP 102 configured to operate according to the updated (readjusted) maximum allowable charging current I_CHARGE' and updated (readjusted) circuit protection settings. The method 800 then continues in the manner described above, until the EVSEP's MCU 202 determines at decision 822 that the PEV has completed charging ("YES" at decision 822), after which the method 800 ends.

It should be emphasized that the various steps and decisions in the exemplary method 800 described above are not necessarily performed in the order shown in the flowchart. Some steps and decisions in the method 800 are, or may be, performed constantly, continuously, or simultaneously, e.g. in the background, as the method 800 is performed, rather than as a chronological sequence of events. For example, for safety reasons the GFCI check at decision 814 is preferably performed constantly, even when a PEV is not plugged into the EVSEP's 102's associated charging station 100, and, as was mentioned above, the calculation in step 826 is preferably performed repeatedly and continuously in the background by the EVSEP's MCU 202 as the EVSEP 102 supplies current to its associated charging station 110 and as source and load conditions in the EV charging system 100 change.

It is also important to point out that the exemplary method 800 is an illustration of how just a single one of the EVSEPs 102 in the EV charging system 100 dynamically adjusts its charge control and circuit protection functions as source and load conditions change over time. In a preferred embodiment of the present disclosure, all of the other EVSEPs 102 in the EV charging system that are distributing charging currents to their respective charging stations 110 perform substantially the same method 800. In one embodiment of the present disclosure the plurality of EVSEPs 102 are configured to operate collectively, with their respective MCUs 202 communicating with one another and exchanging source and load information over the EVSEP communications bus 116 in real time, to dynamically coordinate an allocation (or apportionment) of the total supply current I_SUPP available from the EVSEP panel 104 among the EVSEPs 102. As the EV charging system 100 operates, the MCUs 202 in the EVSEPs 102 repeatedly and continuously monitor the sum of all allocated currents ($I_1+I_2+I_3+\ldots$), so that the total supply current I_SUPPL available from the EVSEP panel 104 is never exceeded. Whenever the MCUs 202 determine that insufficient current is available from the EVSEP panel 104 to satisfy the charging current request I_REQ of any or more charging stations 110 and associated PEVs, the allocated currents are reallocated or reapportioned and the MCUs 102 in the one or more of the EVSEPs 102 lower their maximum allowable charging currents, from I_CHARGE to I_CHARGE', similar to as described above, so that the total current drawn from by the EVSEPs 102 does not exceed the total current supply I_SUPP available from the EVSEP panel 104. The EVSEPs 102 then also readjust their circuit protection setting based on the reduced maximum allowable charging currents I_CHARGE. This collective and coordinated dynamic charge allocation and dynamic circuit protection process is performed continuously by the EVSEPs 102 as the EV charging system 100 operates. By apportioning the total supply current I_SUPP available from the EVSEP panel 104 among the EVSEPs 102, all PEV are able to continue charging, albeit with one or more PEVs charging at a lower charging current I_REQ than requested. Apportioning and allocating also allows an additional PEV to connect to the EV charging system 100 and charge. Although the charging current allocated to it via the associated EVSEP 102 and charging station 110 will also be less than the charging current it requests, the additional PEV will nevertheless be able to charge, whereas if no apportionment was made the additional PEV would have to wait for other PEVs to complete charging before it could commence charging.

There are various ways the MCUs 202 in the EVSEPs 102 can be programmed to allocate or apportion the total supply current I_SUPP among the EVSEPs 102. In one embodiment of the present disclosure, the total supply current I_SUPPL is simply allocated equally among the EVSEPs 102/charging stations 110. In other words, the total supply current I_SUPP is divided by the number of charging stations 110 in use and each EVSEP 102. In another embodiment of the present disclosure, a weighting-based algorithm is employed, according to which the MCUs 202 in the EVSEPs 102 track and monitor the time each of the PEVs has been charging, receive battery information from the individual PEVs, including their individual battery capacities, and estimate the time it will take for each of the PEVs to complete charging at a given charging current. Weighing these factors, the EVSEPs 102 then apportion the total supply current I_SUPP among the EVSEPs 102 similar to as illustrated in FIG. 9. In another embodiment of the present disclosure, some PEVs are given priority over others, for example, in response to a PEV user indicating to the EV charging system 100 a willingness to pay a higher price for charging. FIG. 10 illustrates for example, how the weighting-based algorithm depicted in FIG. 9 can be modified to include this priority-based dependency. Whichever algorithm is employed, each time the EV charging system 100 makes an adjustment to the allocated currents ($I_1+I_2+I_3+\ldots$), one or more of the EVSEPs 102 then adjust its/their maximum allowable charging current I_CHARGE and also preferably, though not necessarily, readjusts its/their circuit protection settings based on the new value of I_CHARGE. The EVSEPs 102 perform these adjustments dynamically and in real time as the EV charging system 100 operates. Note that the circuit protection adjustments made in the examples presented in FIGS. 9 and 10 involve adjustments to the continuous current ratings Ir of the EVSEPs 102. The continuous current ratings Ir are calculated and set and recalculated and reset dynamically by the EVSEPs' MCUs 202 as currents to the EVSEPs in the EV charging system 100 are allocated and reallocated. For example, as illustrated in FIG. 9, after the current allocated to Vehicle A has been lowered from 50 A to 20 A (due to Vehicle B plugging into charge), the EVSEP associated with Vehicle A then lowers its continuous current rating Ir from 62.5 A (125% of 50 A)

to 25 A (125% of 20 A). Although not indicated in FIGS. 9 and 10, those of ordinary skill in the art will appreciate and understand from the teachings of this disclosure that other circuit protection attributes of the EVSEPs, besides just the continuous current ratings Ir, may also (or alternatively) be dynamically adjusted as the EV charging system 100 operates. For example, the long-time delay, short-time delay, and/or instantaneous pickup settings of any one or more of the EVSEPs can also (or alternatively) be adjusted if desired or as conditions warrant.

It should be mentioned that the weight-based charge allocation algorithms depicted in FIGS. 9 and 10 are just two examples of how the EVSEPs 102 can be configured to operate when the total current supply I_SUPPL available from the EVSEP panel 104 may be insufficient to satisfy the charging current requests of PEVs. For example, in one embodiment of the present disclosure, instead of apportioning the total current supply I_SUPPL among the EVSEPs 102 and allowing PEVs to charge all at the same time, the MCUs 202 in the EVSEPs 102 are programmed so that the EVSEPs 102 are allowed to charge, perhaps at their full requested charging currents I_REQ, according to a time-slotted schedule, whereby one or more of the EVSEPs 102 supplying charging currents temporarily transition(s) to the STANDBY state while one or more of the other EVSEPs 102 are given priority and allowed to continue supplying charging current to their respective charging stations 110 and connect PEVs. Once the PEV(s) associated with the priority EVSEP(s) 102 has/have completed charging in its/their scheduled time slots, the remaining EVSEPs 102 that had previously transitioned to the STANDBY state transition back to the ON state to complete the charging of their PEVs, for example, in one or more subsequent time slots.

It should also be mentioned that the dynamic charge control and dynamic circuit protection capabilities of the EV charging system, including any one of the rules-based charging allocation algorithms discussed above, can be designed to extend across multiple EVSEP panels that are configured in a more expansive EV charging system network. All that would be required to implement the more expansive EV charging system would be to construct communications links between the various EVSEP panels. In this more expansive EV charging system the total current supply I_SUPPL available at any one of the EVSEP panels could be increased or decreased as desired or necessary, even as the various EVSEPs 102 dynamically coordinate the allocation or apportionment of charging currents to the various EVSEPs 102. A dynamic allocation scheme, similar to described above, could also be implemented at the panel level.

The ability of the EVSEPs 102 to individually and collectively dynamically adjust their maximum allowable charging currents and circuit protection settings is beneficial since it avoids uneven usage of the EV charging system infrastructure. The more even usage avoids the one-size-fits-all approach of conventional EV charging systems, which requires use of oversized power distribution equipment, yet still allows most every PEV charging need to be accommodated. Another advantage the EV charging system 100 has over conventional EV charging systems is that the dynamic charge control and dynamic circuit protection functions are performed locally, with the EVSEPs' MCUs' 102 communicating, cooperating, and coordinating with one another over the EVSEP communications bus 116. No centralized computer is required and no cloud connection or network is required, thus avoiding a centralized control scheme that would undesirably pose as a single point of failure and make the EV charging system vulnerable to hackers and cyber attacks. Yet another advantage the EV charging system 100 has over conventional EV charging systems is that the frame sizes of the EVSEPs 102 are configurable. This attribute is afforded by the EVSEPs 102 use of bi-directional solid-state switches 204 to provide short-circuit and overcurrent protection. This frame-size configurability is not possible in prior art EV charging systems, which rely on electromechanical circuit breakers, external to the EV charging system, for circuit protection.

Figure 11:
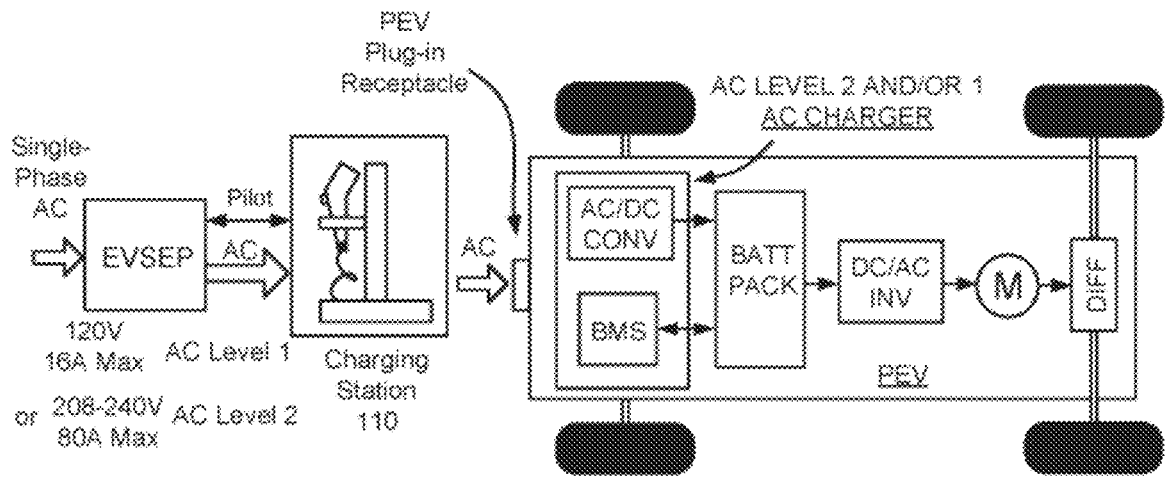
FIG. 11 is a drawing illustrating how an EVSEP and associated EV charging station are configured in relation to a plug-in EV (PEV) that supports AC charging, according to one embodiment of the present disclosure.
Figure 12:
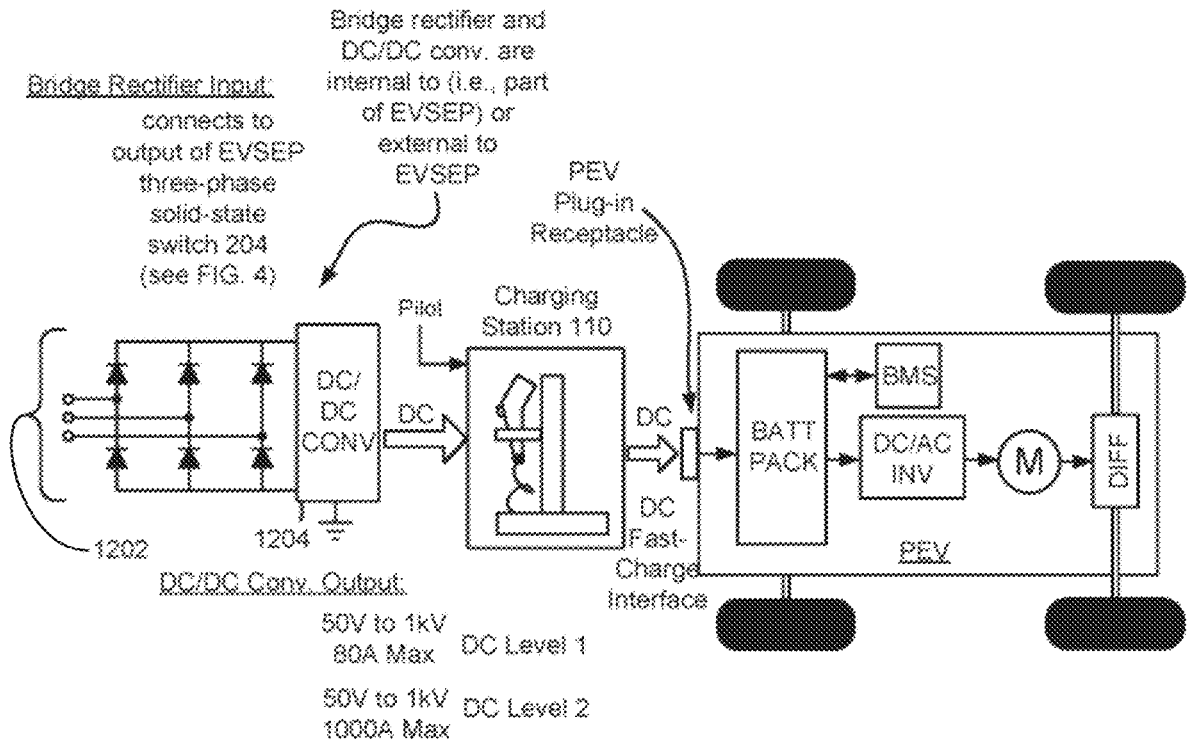
FIG. 12 is a drawing illustrating how a modified EVSEP, designed and constructed to support DC-fast charging, and associated EV charging station are configured in relation to a PEV that supports DC-fast charging, according to one embodiment of the present disclosure.

The exemplary EV charging system 100 and EVSEPs 102 described above are well-suited for AC PEV charging, in particular, SAE J1772 AC Level 1 (120 VAC, 16 A Max) and/or AC Level 2 (208-240 VAC, 80 A Max) PEV charging. This AC charging configuration is illustrated in FIG. 11. In another embodiment of the present disclosure, the EVSEPs 102 are modified so that they are capable of supporting DC-fast charging, for example, SAE J1772 DC Level 1 (50V to 1 kV, 80 A Max) and/or DC Level 2 (50V to 1 kV, 1000 A Max) PEV charging, as illustrated in FIG. 12. To support DC charging, in one embodiment of the present disclosure each of the EVSEPs 102 is modified to further include an AC/DC converter, for example, a three-phase AC-to-DC bridge rectifier 1202 (as shown in FIG. 12) in the case of a three-phase AC charging system. The three-phase AC-to-DC bridge rectifier 1202 is configured to mate with a three-phase implementation of the bi-directional solid-state switch 204 (similar to that depicted in FIG. 4). The modified EVSEP 102 further includes a DC/DC converter 1204 that steps the converted DC voltage down to a level suitable for charging. All of the other functions and capabilities of the AC version of the EVSEPs 102 described above, including the dynamically adjustable circuit protection charge control capabilities are included in the modified (i.e., DC-fast charging) version of the EVSEP 102 depicted in FIG. 12.

In one embodiment of the present disclosure the bi-directional solid-state switches 204 in the DC-modified versions of the EVSEPs 102 are not only configured and controlled by their respective MCUs 202 to provide dynamically adjustable circuit protection, the MOSFETs in the bi-directional solid-state switches 204 are further configured and controlled to serve as a front end for power factor correction. In yet another embodiment of the present disclosure, the bi-directional solid-state switches 204 are also (or alternatively) configured to regulate the DC voltage produced at the output of the three-phase AC-to-DC bridge rectifier 1202 or output of the DC/DC converter 1204.

Figure 13:
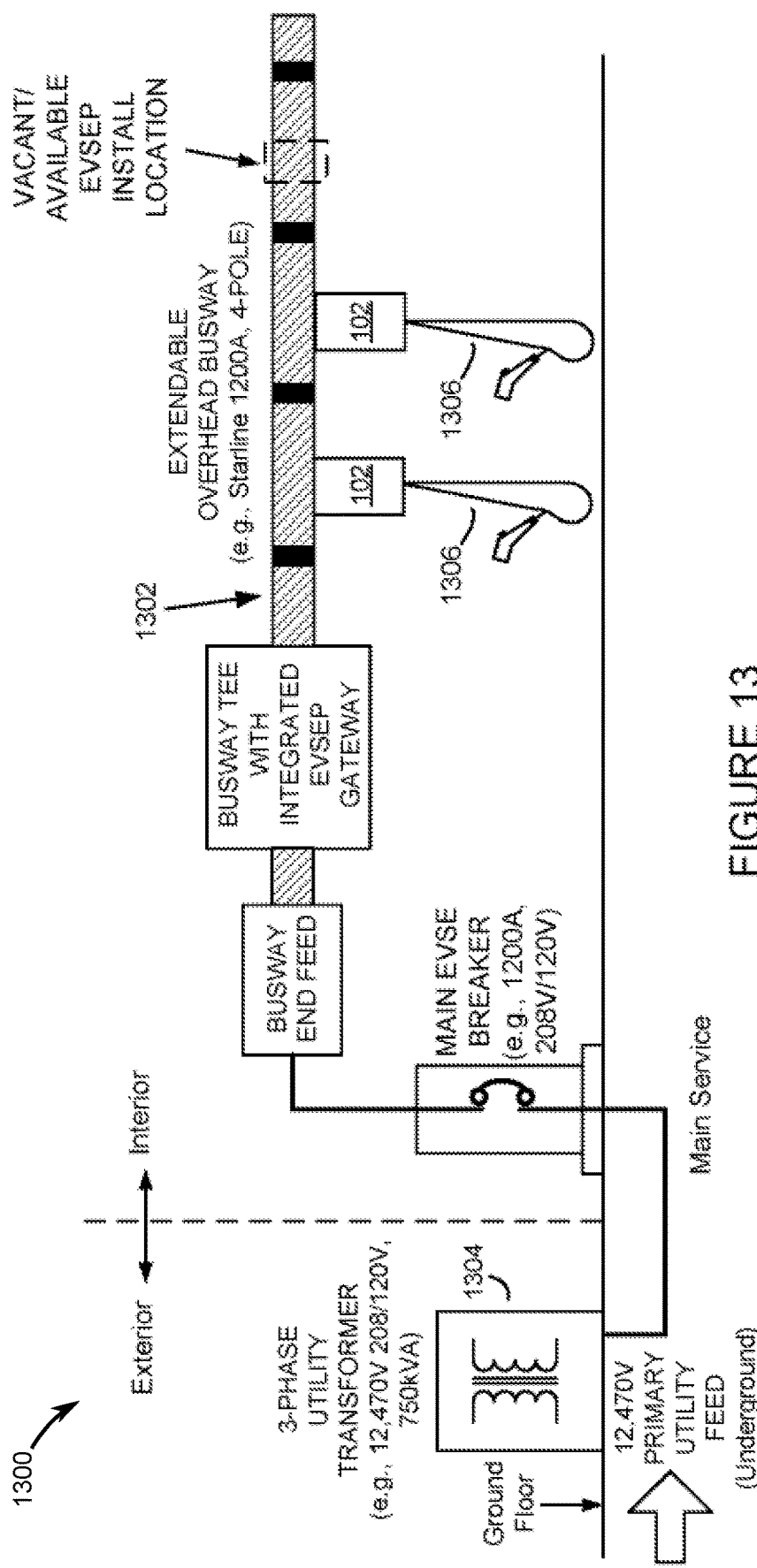
FIG. 13 is a drawing depicting an EV charging system that is adapted and well-suited to serve as a fleet charging facility for EV buses and other municipal EVs, according to an embodiment of the present disclosure.

FIG. 13 is a drawing depicting an EV charging system 1300, according to another embodiment of the present disclosure. The EV charging system 1300 is particularly well-suited to serve as a fleet charging facility, for example, for EV buses used by a municipality. The EV charging system 1300 comprises an overhead busway 1302 (e.g., Starline 1200 A, 4-pole) that distributes AC power supplied from two or three phases of the secondary winding of a three-phase utility transformer 1304 to a plurality of EVSEPs 102 configured along the overhead busway 1302. Because of the high currents (up to and possibly above 1000 A) that can be supplied by secondary of the utility transformer 1304, the EV charging system's main service is preferably distributed underground, for example, with each of the conductors, L1, L2, L3 (if three-phase) routed in separate PVC conduits/pipes (e.g., 4", schedule 40 PVC conduits). Instead of configuring and housing the EVSEPs 102 within a distribution panel, the EVSEPs 102 are configured as busplugs that connect, i.e., "plug into" matching receptacles configured at various locations in the overhead busway 1302. Additional charging stations can be added by simply plugging additional EVSEPs/busplugs 102 into vacant receptacles and attaching corresponding charging cables 1306 to the busplugs along the busway 1302. The EV charging system 1300 supports, AC and DC charging, by simply plugging in one of the EVSEPs 102 like that used in FIG. 11 (AC charging) or the EVSEP 102 depicted in FIG. 12, which has been modified to include three-phase AC-to-DC bridge rectifier 1202 and DC/DC converter 1204 (DC-fast charging).

In the EV charging system 1300 described above, DC-fast charging is supported by modifying the EVSEPs 102 to include a three-phase AC-to-DC bridge rectifier 1202 and DC/DC converter 1204. In an alternative embodiment, a single, large AC/DC converter is employed to convert the large line-to-line AC voltages (e.g., 480 VAC) at the utility transformer 1304 secondary, thus obviating the need to perform the AC/DC conversion at the outputs of the EVSEPs 102. With that modification made, the EV charging system 1300 becomes a DC-fast-charging-only facility.

Additional embodiments that follow are based upon a difference in requirements between an Underwriters Laboratory (UL) panelboard and a UL 2594 EVSE. Since the UL 67 panelboard with UL breakers must be safely operated in all applications, solid-state circuit breakers (SSCBs) in an EVSE specific application allows for reduced equipment costs an increased safety along with other optimizations not possible in other applications. Moreover, due to the inherent nature of SSCBs that includes millisecond reaction time to stop the flow of current, SSCBs are employable in EVSE applications that are not easily attainable with other methods of power delivery.

Figure 14:
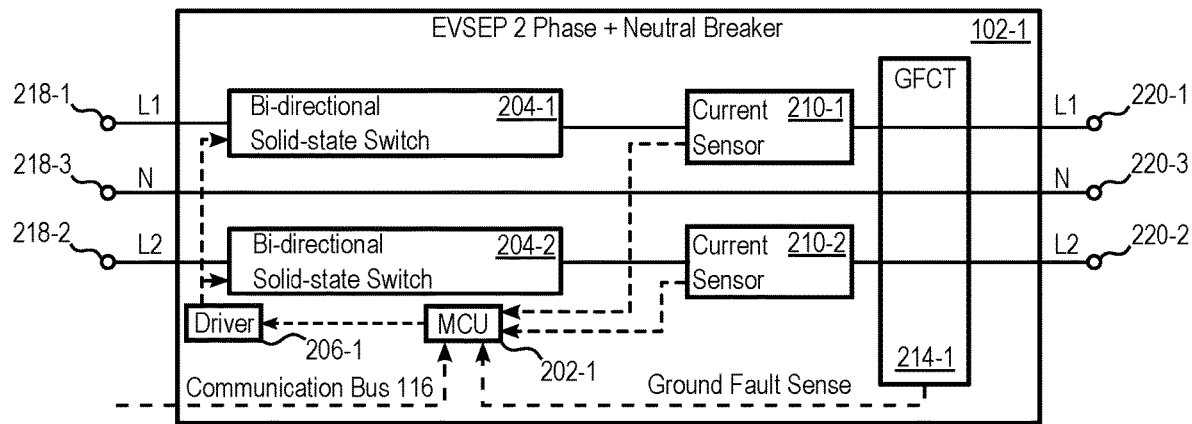
FIG. 14 is a drawing of an EVSEP that includes an internal ground fault current transformer (GFCT) that is configured to detect ground fault currents in two-phase conductors and a neutral conductor, according to an embodiment of the present disclosure.

FIG. 14 is a drawing of an EVSEP 102-1 that includes an internal ground fault current transformer (GFCT) 214-1 that is configured to detect ground fault currents in two-phase conductors (L1, L2) and the neutral conductor N, according to an embodiment of the present disclosure. The EVSEP 102-1 has a first bi-directional solid-state switch 204-1 and a first current sensor 210-1 coupled in series between an L1 line-side terminal 218-1 and an L1 load-side terminal 220-1. The EVSEP 102-1 has a second bi-directional solid-state switch 204-2 and a second current sensor 210-2 coupled in series between an L2 line-side terminal 218-2 and an L2 load-side terminal 220-2. A neutral conductor N is coupled between a neutral line-side terminal 218-3 and a neutral load-side terminal 220-3, wherein a portion of the neutral conductor N is in current sensing proximity of the GFCT 214-1. A first microcontroller unit (MCU) 202-1 is configured to receive current sensing signals from the first current sensor 210-1 and the second current sensor 210-2. The first MCU 202-1 is further configured to receive a ground fault sense signal from the GFCT 214-1 that indicates a ground fault on the neutral conductor N and/or the two-phase conductors (L1, L2). The first MCU 202-1 is further configured to receive and/or transmit data over the EVSEP communication bus 116. As such the first MCU 2201 is configured to provide individual and independent control of the of the N number of EV charging stations over the EVSEP communication bus 116. The EVSEP 201-1 further includes a first driver 206-1 that is configured to drive the first bi-directional solid-state switch 204-1 and the second bi-directional solid-state 204-2 between ON in a state of conduction and OFF in a state of non-conduction.

Figure 15:
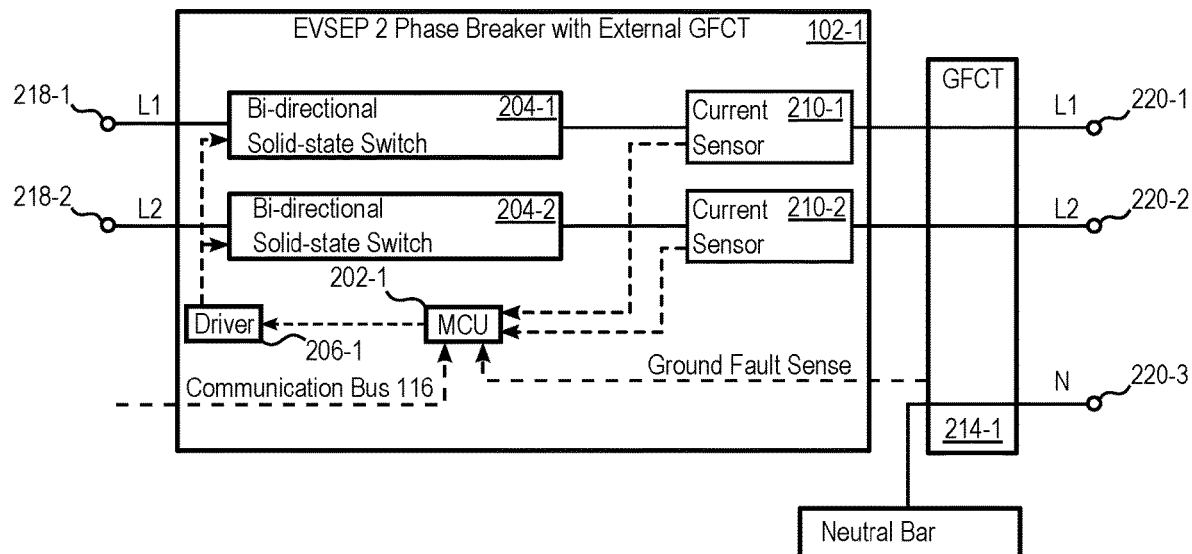
FIG. 15 is a drawing of a version the EVSEP that is configured to respond to a ground fault sense signal generated by an external version of the GFCT that is configured to detect ground fault currents in two-phase conductors and a neutral conductor, according to an embodiment of the present disclosure.

FIG. 15 is a drawing of a version the EVSEP 102-1 that is configured to respond to a ground fault sense signal generated by an external version of the GFCT 214-1. In this embodiment, the GFCT 214-1 is configured to detect ground fault currents in two-phase conductors (L1, L2) and the neutral conductor N. However, in this embodiment, the GFCT 214-1 is external to the EVSEP 102-1 and the neutral conductor N is coupled between a neutral bar and the neutral load-side terminal 220-3. A portion of the neutral conductor N is in current sensing proximity of the GFCT 214-1 to ensure generation of the ground fault sense signal whenever a ground fault event involving the neutral conductor N occurs.

Figure 16:
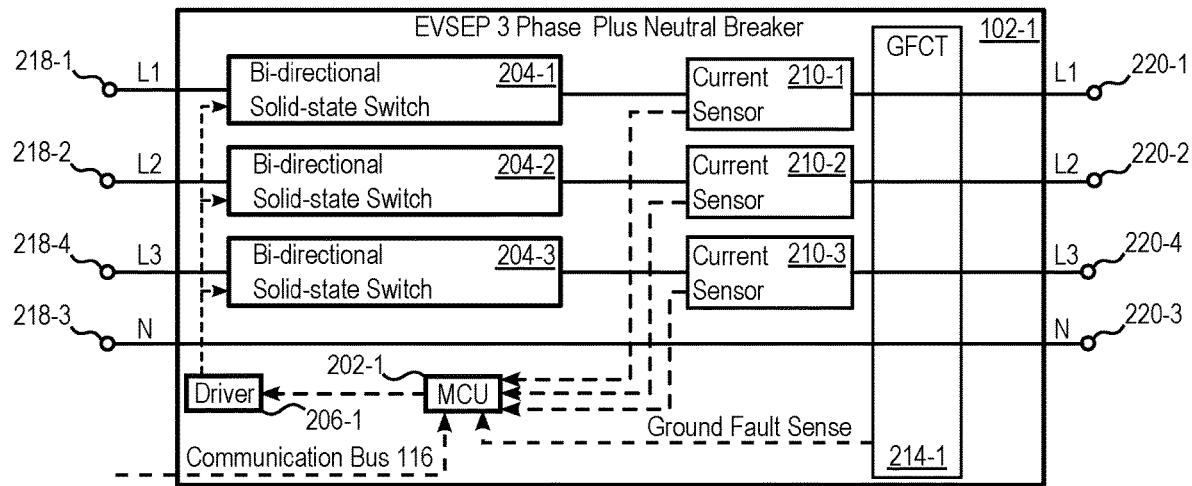
FIG. 16 is a drawing of an EVSEP that includes a version of the internal GFCT that is configured to detect ground fault currents in three-phase conductors and a neutral conductor, according to an embodiment of the present disclosure.

FIG. 16 is a drawing of an embodiment of the EVSEP 102-1 that includes a version of the internal GFCT 214-1 that is configured to detect ground fault currents in the three-phase conductors (L1, L2, L3) and the neutral conductor N. In this embodiment, the EVSEP 102-1 further includes a third bi-directional solid-state switch 204-3 and a third current sensor 210-3 coupled in series between an L3 line-side terminal 218-4 and an L3 load-side terminal 220-4. The MCU 202-1 is configured to receive a current sense signal from the third current sensor 210-3.

Figure 17:
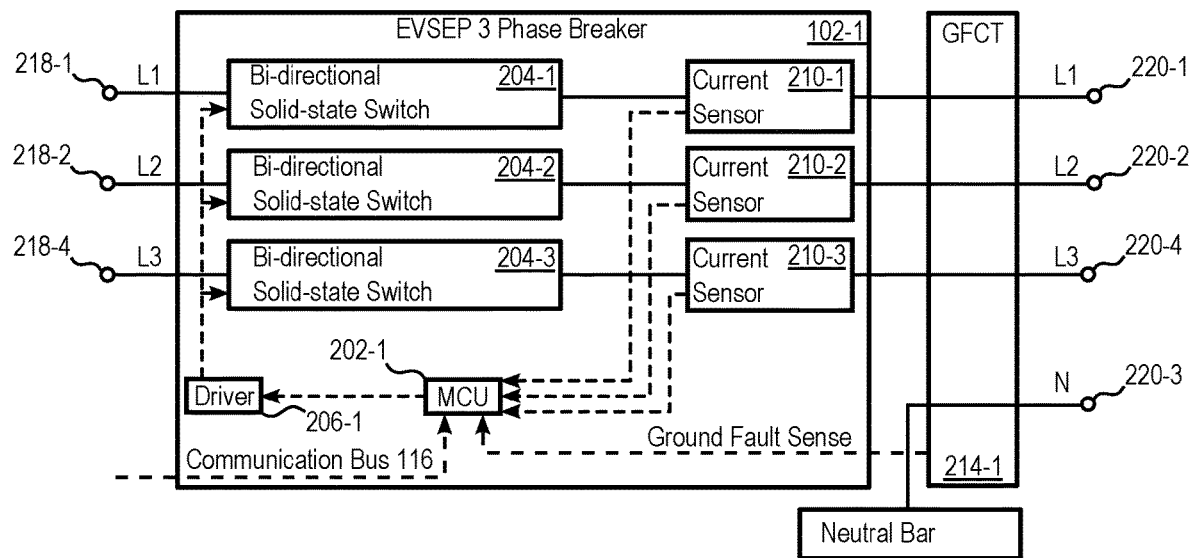
FIG. 17 is a drawing of an EVSEP that is configured to respond to a ground fault sense signal generated by an external version of the GFCT that is configured to detect ground fault currents in three-phase conductors and a neutral conductor, according to an embodiment of the present disclosure.

FIG. 17 is a drawing of a version the EVSEP 102-1 that is configured to respond to the ground fault sense signal generated by the external version of the GFCT 214-1. In this embodiment, the GFCT 214-1 is configured to detect ground fault currents in three-phase conductors (L1, L2, L3) and the neutral conductor N. However, in this embodiment, the GFCT 214-1 is external to the EVSEP 102-1 and the neutral conductor N is coupled between the neutral bar and the neutral load-side terminal 220-3. A portion of the neutral conductor N is in current sensing proximity of the GFCT 214-1 to ensure generation of the ground fault sense signal whenever a ground fault event involving the neutral conductor N occurs.

Other embodiments of the EVSEP 102-1 depicted in FIGS. 14 through 17, and referring back to FIG. 2, may further include the closeable air gap 216 of the air gap disconnect unit 208, between input (line-side) terminals 218 and output (load-side) terminals 220. These other embodiments of the EVSEP 201 are configurable in three possible states that are as follows:

the ON state during which the closable air gap 216 of the air gap disconnect unit 208 of associated ones of the N number of charging stations is closed and the bidirectional solid-state switch 204 of the individual active ones of an N number of charging stations is ON;

the STANDBY state during which the closable air gap 216 of the air gap disconnect unit 208 of associated ones of the N number of charging stations is closed and the bidirectional solid-state switch 204 of the individual active ones of the N number of charging stations is OFF; and the OFF state during which the closable air gap 216 of the air gap disconnect unit 208 of associated ones of the N number of charging stations is open and the bidirectional solid-state switch 204 of the individual ones of the N number of charging stations is OFF.

Figure 18:
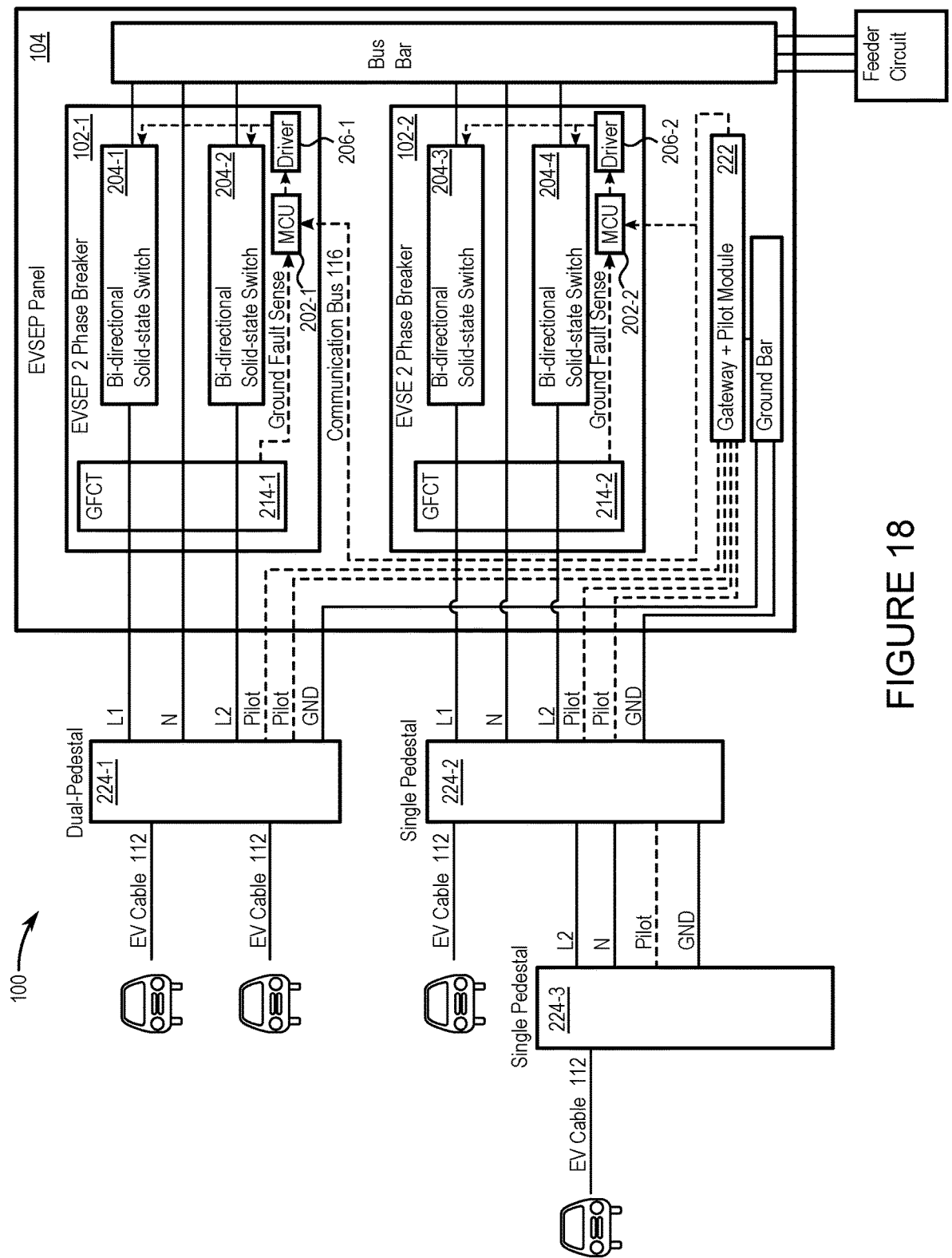
FIG. 18 is a drawing of a version of the electric vehicle charging system that is configured to charge two electric vehicles per EVSEP having the internal GFCT as depicted in FIG. 14 and further including a gateway and pilot module configured to communicate with pedestals, according to an embodiment of the present disclosure.

FIG. 18 is a drawing of an exemplary version of the EV charging system 100 that is configured to charge two electric vehicles per each of a first EVSEP 102-1 and a second EVSEP 102-2 that make up the EVSEP panel 104. In this exemplary embodiment, the first EVSEP 102-1 has a first internal GFCT 214-1 and a second EVSEP 102-2 has a second internal GFCT 214-2 as depicted in FIG. 14. and further includes a gateway and pilot module 222 configured to communicate with pedestals 224-1, 224-2, and 224-3. In this embodiment, the pedestal 224-1 is a dual pedestal that is configured to charge two PEVs.

In operation, the phase L1 provides charging current flowing through a first bi-directional solid-state switch 204-1 and the neutral N to a first PEV using the dual pedestal 224-1. The phase L2 provides charging current flowing through a second bi-directional solid-state switch 204-2 and the neutral N to a second PEV using the dual pedestal 224-1. Ground faults associated with the dual pedestal 224-1 are sensed by the first GFCT 214-1 that in response generates a ground fault sense signal that is received by a first MCU 202-1 which in turn commands a first driver 206-1 to shut off the flow of current flowing through the affected phase(s) L1 and/or L2. Pilot signals from the PVEs charging from the dual pedestal 224-1 is received by the gateway+pilot module 222, which in turn routes information associated with the pilot signal to the first MCU 202-1 by way of the communications bus 116.

A PEV using the single pedestal 224-2 is charged by a charging current flowing through phase L1 controlled by a third bi-directional solid-state switch 204-3 that comprises a second EVSEP 102-2. The charging current provided to the associated PEV returns to the busbar by way of the neutral N. Ground faults associated with the second pedestal 224-2 are sensed by a second GFCT 214-2 that in response generates a ground fault sense signal that is received by a second MCU 202-2, which in turn commands a second driver 206-2 to shut off the flow of current flowing through the affected phase(s) L1 and/or L2. A pilot signal from the PVE charging from the single pedestal 224-2 is received by the gateway+pilot module 222, which in turn routes information associated with the pilot signal to the second MCU 202-2 by way of the communications bus 116.

A PEV using the single pedestal 224-3 is charged by a charging current flowing through phase L2 controlled by a fourth bi-directional solid-state switch 204-4 that comprises the second EVSEP 102-2. The charging current provided to the PEV charging at the single pedestal 224-3 returns to the busbar by way of the neutral N. Ground faults associated with the third pedestal 224-3 are sensed by a second GFCT 214-2 that in response generates a ground fault sense signal that is received by the second MCU 202-2 which in turn commands a second driver 206-1 to shut off the flow of current flowing through the affected phase L2. A pilot signal from the PVE charging from the single pedestal 224-3 is received by the gateway+pilot module 222, which in turn routes information associated with the pilot signal to the second MCU 202-2 by way of the communications bus 116. It should be noted that the pilot module can be separate from the gateway without deviating from the scope of the disclosure.

The GFCT 214-2, in FIG. 18, detects ground fault currents in both EV systems connected to the dual-pedestal 224-1. The system, in response to a ground fault, will shut off the flow of current through both L1 and L2. The system can restart L1, test for ground fault and enable L1 if no ground fault is present. If a ground fault is present in L1 the system will shut off the flow of current through L1 and turn L2 on. This will isolate the fault to only the impacted EVSE.

Figure 19:
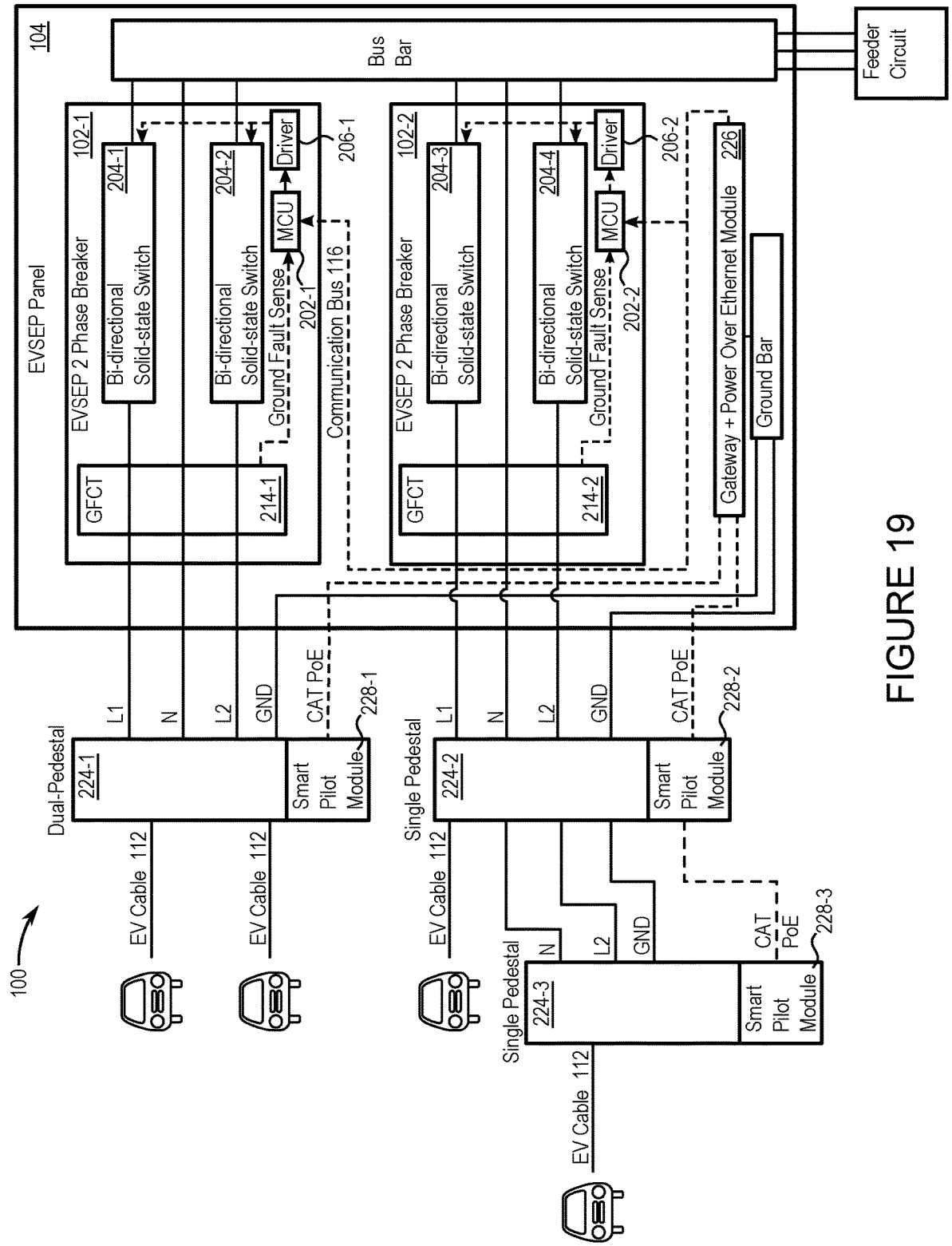
FIG. 19 is a drawing of a version of the electric vehicle charging system that is configured to charge two electric vehicles per EVSEP and includes a gateway and a substantially low-voltage DC power and data module such as the power over ethernet type to communicate with smart pilot modules in pedestals, according to an embodiment of the present disclosure.

FIG. 19 is a drawing of a version of the electric vehicle charging system 100 that is configured to charge four electric vehicles per EVSEP panel 104 and includes a gateway and power over ethernet (PoE) module 226 to communicate with smart pilot modules 228-1, 228-2, and 228-3 in pedestals 224-1, 224-2, and 224-3, respectively. It is to be understood that the PoE module 226 is not restricted to a particular type and may be various other types of substantially low-voltage DC and data modules.

The smart pilot modules 228-1, 228-2, and 228-3 are configured to provide high-level communication with PEVs that are to be charged or are being charged. The smart pilot modules 228-1, 228-2, and 228-3 are customizable to adapt to future communication protocols or other user interfaces that might be required. For example, if "plug and charge" is allowed by PEVs, the smart pilot modules 228-1, 228-2, and 228-3 are configured to translate the vehicle data of the PEVs and report back to the EVSEP panel 104 to initiate charging sessions. The smart pilot modules 228-1, 228-2, and 228-3 may also be configured to be used with a radio frequency identification (RFID) or credit card reader to send the payment data back to the EVSEP panel 104 for session activation. The EVSEP panel 104 is typically the control hub of the EV charging system 100 and there is no low level power at the pedestals 224-1, 224-2, and 224-3. As such, the smart pilot modules 228-1, 228-2, and 228-3 are configured to operate at a safe low voltage like 48 VDC PoE, for example. In this regard, power over ethernet is supplied over category 5 or better (CAT PoE) cabling that couples the gateway+PoE module 226 with the smart pilot modules 228-1, 228-2, and 228-3. In some embodiments, the smart pilot modules 228-1, 228-2, and 228-3 are configured to be updated remotely via over the air updates through the EVSEP panel 104. Moreover, the smart pilot modules 228-1, 228-2, and 228-3 are configured to be replaced easily if a new EV standard is released without needing to replace the EVSEP panel 104. This configuration makes the EV charging system 100 easily upgradable and future proof.

Figure 20:
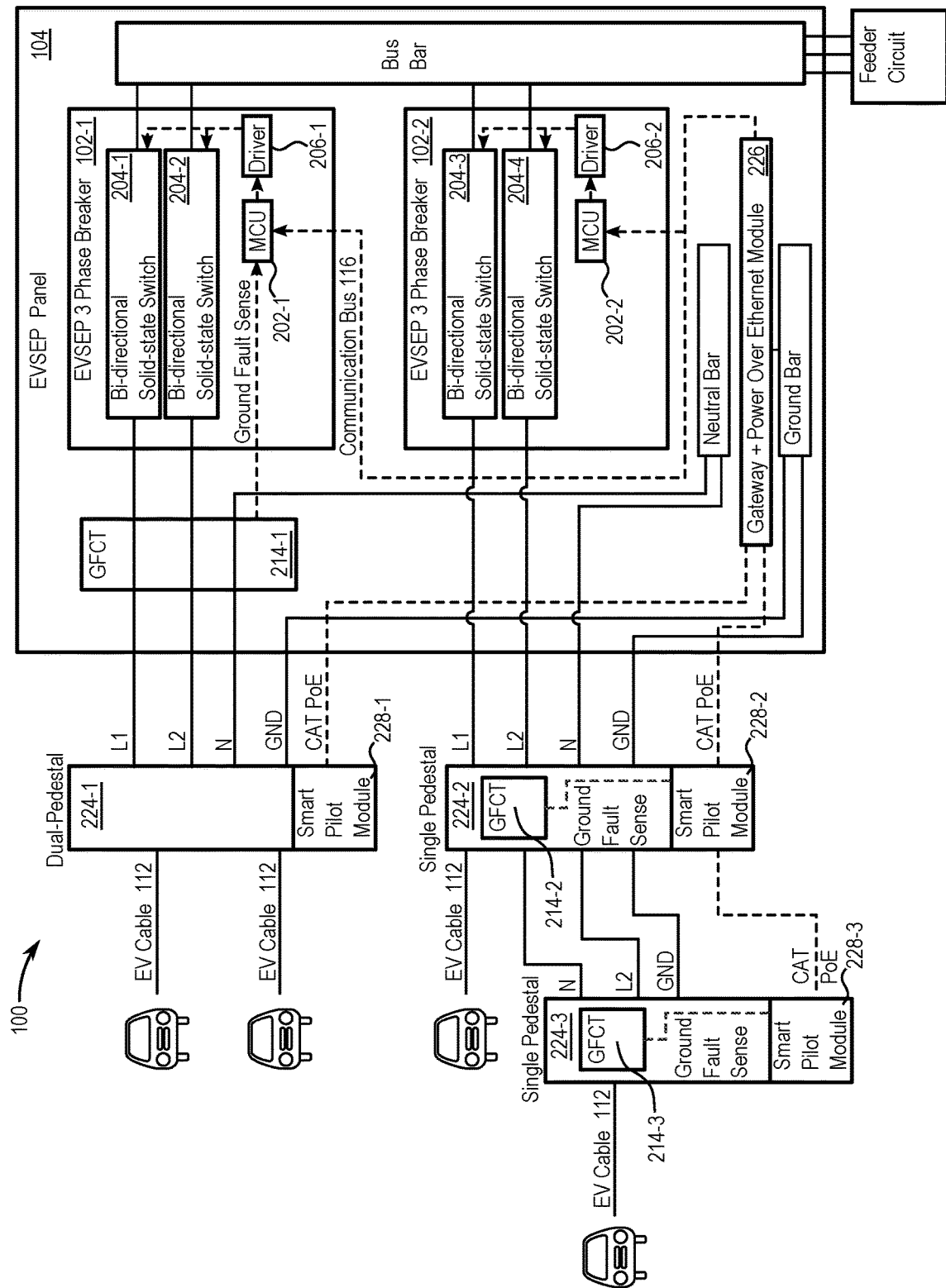
FIG. 20 is a drawing of a version of the electric vehicle charging system that is configured to charge two electric vehicles per EVSEP with one EVSP configured to respond to ground fault sense signals generated by external GFCTs located at pedestals, according to an embodiment of the present disclosure.

FIG. 20 is a drawing of a version of the electric vehicle charging system 100 that is configured to charge two electric vehicles per the first EVSEP 102-1 and the second EVSEP 102-2. The second EVSEP 102-2 is configured to respond to ground fault sense signals generated by external GFCTs 214-2 and 214-3 located at the single pedestals 224-2 and 224-3, respectively. During operation, ground faults associated with the second single pedestal 224-2 are detected by the first external GFCT 214-2, which in response generates a ground fault sense signal that is processed by the smart pilot module 228-2. Information indicating a ground fault is passed immediately over the CAT PoE to the gateway+Power Over Ethernet Module 226, which in turn passes the ground fault indication to the second MCU 202-2. In response to the ground fault indication, the second MCU 202-2 commands the second driver 206-2 to stop the flow of current through the appropriate one(s) of the third bi-direction switch 204-3 and/or the fourth bi-direction switch 204-4.

Ground faults associated with the third single pedestal 224-3 are detected by the second external GFCT 214-3, which in response generates a ground fault sense signal that is processed by the third smart pilot module 228-3. Information indicating a ground fault is passed immediately over the CAT PoE to the gateway+Power Over Ethernet Module 226, which in turn passes the ground fault indication to the second MCU 202-2. In response to the ground fault indication, the second MCU 202-2 commands the second driver 206-2 to stop the flow of current through the fourth bi-direction solid-state switch 204-4.

Figure 21:
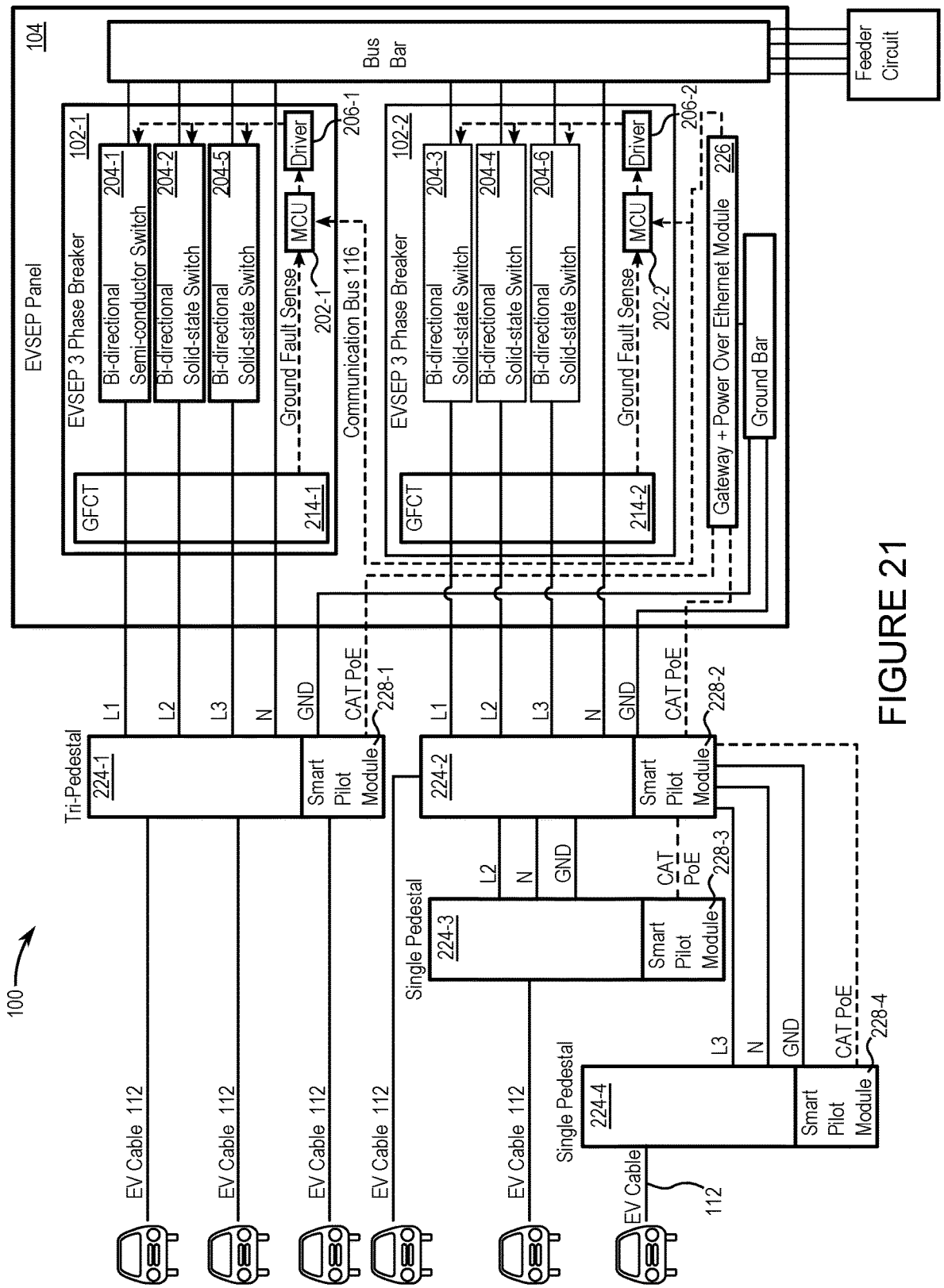
FIG. 21 is a drawing of a version of the electric vehicle charging system that is configured to charge three electric vehicles per EVSEP and includes the gateway and the substantially low-voltage DC power and data module to communicate with smart pilot modules in pedestals, according to an embodiment of the present disclosure.

FIG. 21 is a drawing of a version of the electric vehicle charging system 100 that is configured to charge three electric vehicles per the first EVSEP 102-1 and the second EVSEP 102-2. Addition of a third phase L3 to the EVSEP panel 104 provides for charging six electric vehicles in total. A fifth bi-directional solid-state switch 204-5 is coupled in series with a third phase L3 conductor between the bus bar and a tri-pedestal version of the first pedestal 224-1. The fifth-bi-directional switch semi-conductor 204-5 is integrated with the first bi-directional solid-state switch 204-1 and the second bi-directional solid-state switch 204-2 within the first EVSEP 102-1. The first MCU 201-1 is configured to command the first driver 206-1 to control current flowing through the fifth bidirectional solid-state switch 204-5 and thereby control the charging current to a third electric vehicle charging at the first pedestal 224-1. In this embodiment, the GFCT 214-1 is configured to detect ground fault currents in three-phase conductors (L1, L2, L3) and the neutral conductor N that are associated with the first pedestal 224-1.

A sixth bi-directional solid-state switch 204-6 is coupled in series with another third phase L3 conductor between the bus bar and the first single pedestal 224-2. The sixth-bi-directional solid-state switch 204-6 is integrated with the third bi-directional solid-state switch 204-3 and the fourth bi-directional solid-state switch 204-4 within the second EVSEP 102-2. The second MCU 202-2 is configured to command the second driver 206-2 to control current flowing through the sixth bidirectional solid-state switch 204-6 and thereby control the charging current to a sixth electric vehicle charging at a fourth single pedestal 224-4. In this embodiment, the second GFCT 214-2 is configured to detect ground fault currents in three-phase conductors (L1, L2, L3) and the neutral conductor N associated with the pedestals 224-2, 224-3, and 224-4.

Figure 22:
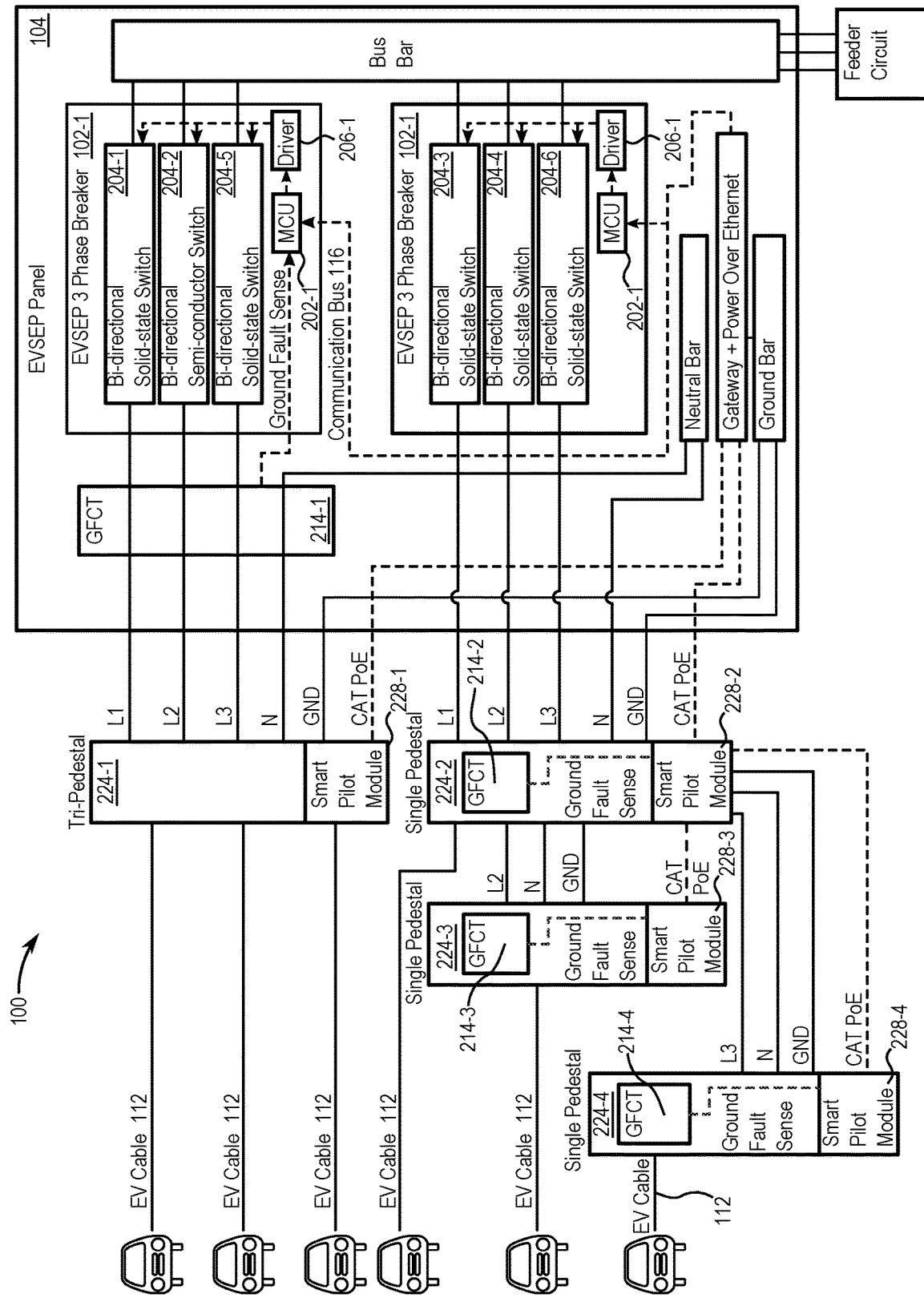
FIG. 22 is a drawing of a version of the electric vehicle charging system that is configured to charge three electric vehicles per EVSEP with one EVSP configured to respond to ground fault sense signals generated by external GFCTs located at pedestals, according to an embodiment of the present disclosure.

FIG. 22 is a drawing of a version of the electric vehicle charging system 100 that is configured to charge three electric vehicles per the first EVSEP 102-1 and the second EVSEP 102-2. The second EVSP 102-2 is configured to respond to ground fault sense signals generated by external GFCTs 214-2, 214-3, and 213-4 located at single pedestals 224-2, 224-3 and 224-4, respectively. In exemplary embodiments, one or more bi-directional power semiconductors such as SiC MOSFETs may be used to realize the bi-directional solid-state switches 204-1, 204-2, 204-3 204-4, 204-5, and 204-6. Also, the GFCTs 214-1 through 214-4 may be the GFCI 214 depicted in FIG. 2.

Figure 23:
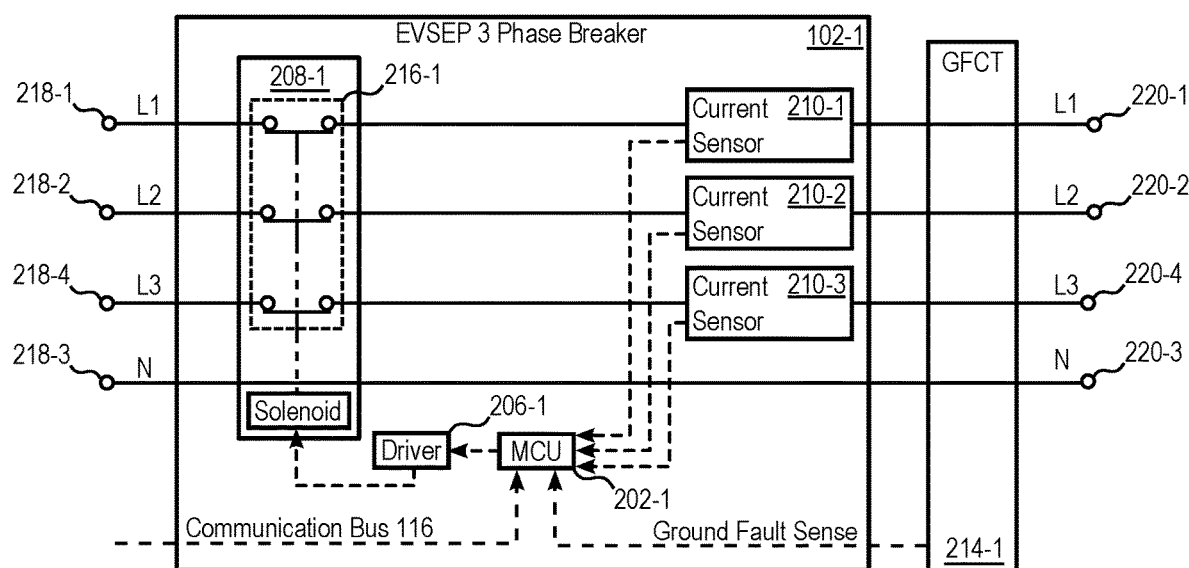
FIG. 23 is a drawing of an electromechanical version the EVSEP that is configured to respond to a ground fault sense signal generated by an external version of the GFCT that is configured to detect ground fault currents in two-phase conductors.

FIG. 23 is a drawing of an electromechanical version the EVSEP 102-1 that is configured to respond to a ground fault sense signal generated by an external version of the GFCT 214-1 that is configured to detect ground fault currents in two-phase conductors. This exemplary embodiment does not employ solid state switches. Instead, the electromechanical version the EVSEP 102-1 employs the air gap disconnect unit 208-1 having the closeable air gap 216-1. The air gap disconnect unit 208-1 is coupled between corresponding ones of the line-side terminals 218-1, 218-2, and 218-4 and the load-side terminals 220-1, 220-2, and 220-4. In this exemplary embodiment, the air gap disconnect unit 208-1 can by either of the relay or the contactor type.

In operation, the GFCT 214-1, detects ground fault currents in any associated EV systems (not shown in FIG. 23). In response to a ground fault, the MCU 202-1 will shut off the flow of current through L1, L2, and L3. The MCU 202-1 is configured to then restart L1, test for ground fault and enable L1 if no ground fault is present. If a ground fault is present in L1 the MCU 202-1 will shut off the flow of current through L1 and turn L2 on. The MCU 202-1 will then test for ground fault and enable L2 if no ground fault is present. If a ground fault is present in L2 the MCU 202-1 will shut off the flow of current through L2 and turn L3 on. The MCU 202-1 will next test for ground fault and enable L3 if no ground fault is present. If a ground fault is present in L3 the MCU 202-1 will shut off the flow of current through L3. This will isolate the fault to only the impacted phase of the phases L1, L2, and L3.

Figure 24:
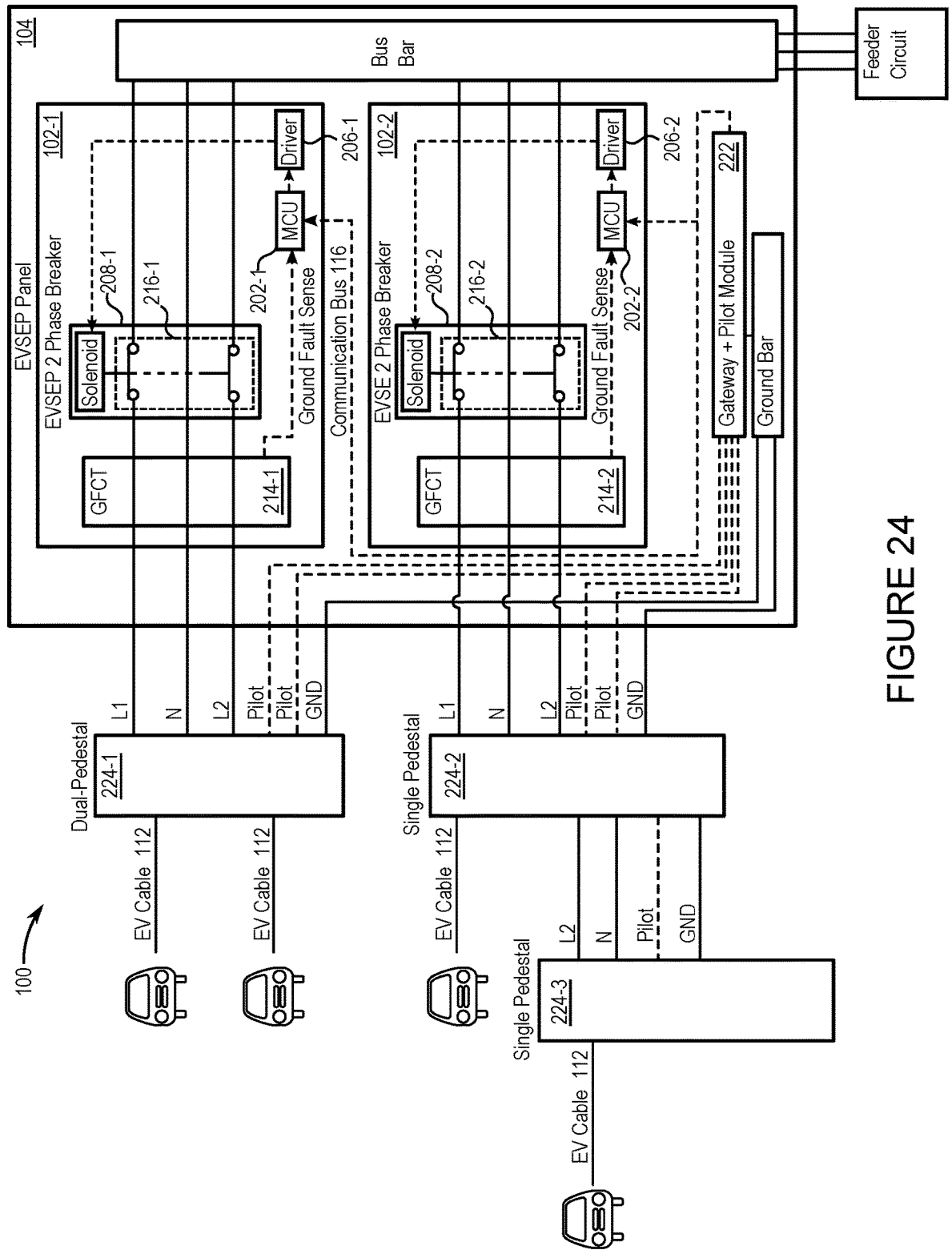
FIG. 24 is a drawing of an electromechanical version of the electric vehicle charging system that is configured to charge two electric vehicles per EVSEP including the gateway and pilot module configured to communicate with pedestals, according to an embodiment of the present disclosure.

FIG. 24 is a drawing of an electromechanical version of the electric vehicle charging system 100 that is configured to charge two electric vehicles per EVSEP including the gateway and pilot module 222 configured to communicate with pedestals 224-1 and 224-2, according to an embodiment of the present disclosure. This exemplary embodiment does not employ solid state switches. Instead, the electromechanical version the EVSEP 102-1 employs the air gap disconnect unit 208-1 having the closeable air gap 216-1. Similarly, the EVSEP 102-2 employs the air gap disconnect unit 208-2 having the closeable air gap 216-2.

While various embodiments of the present disclosure have been described, they have been presented by way of example and not limitation. It will be apparent to persons skilled in the relevant art that various changes in form and detail may be made to the exemplary embodiments without departing from the true spirit and scope of the present disclosure. Accordingly, the scope of the present disclosure should not be limited by the specifics of the exemplary embodiments but, instead, should be determined by the appended claims, including the full scope of equivalents to which such claims are entitled.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. An electric vehicle supply equipment (EVSE) unit configured in an EV charging system, the EVSE unit, comprising:
 an N number of line-side terminals, wherein N is a counting number greater than zero;
 an N number of load-side terminals;
 an N number of bi-directional solid-state switches, one each of the bi-directional solid-state switches being coupled between corresponding ones of the line-side terminals and the load-side terminals;
 a disconnect unit coupled in series with corresponding ones of the N number of bi-directional solid-state switches that are coupled between corresponding ones of the line-side terminals and the load-side terminals;
 an N number of EV charging stations, one each coupled to corresponding ones of the N number of load-side terminals by an N number of phase conductors, wherein each of the N number of charging stations is configurable in three possible states for each of the N number of charging stations and at any given time is configured in one of the three possible states comprising:
  an ON state during which the disconnect unit of associated ones of the N number of charging stations is closed and the bidirectional solid-state switch of the individual active ones of the N number of charging stations is ON;
  a STANDBY state during which the disconnect unit of associated ones of the N number of charging stations is closed and the bidirectional solid-state switch of the individual active ones of the N number of charging stations is OFF; and
an OFF state during which the disconnect unit of associated ones of the N number of charging stations is open and the bidirectional solid-state switch of the individual ones of the N number of charging stations is OFF;
a neutral conductor coupled to a neutral terminal of the N number of EV charging stations, wherein the neutral conductor is configured to complete a charging circuit with an associated one of the N number of phase conductors supplying a charging current to a plug-in vehicle (PEV); and
a controller configured to provide individual and independent control of the N number of EV charging stations,
wherein the controller and the N number of bidirectional solid-state switches are configured to both control a maximum allowable charging current available to the N number of EV charging stations when one or more PEVs are plugged into associated ones of the N number of EV charging stations and provide circuit protection to the associated ones of the EV charging stations and the one or more PEVs, and to generate the ON state for associated ones of the N number of charging stations when supplying charging current to the associated ones of the N number of charging stations but transitioning temporarily from the ON state to the STANDBY state when dynamically adjusting the maximum allowable charging current available to associated PEVs from the associated N number of charging stations.

2. The EVSE unit of claim 1 wherein N equals one or two.

3. The EVSE unit of claim 1 wherein N equals three.

4. The EVSE unit of claim 1 wherein the controller is further configured to adjust one or more circuit protection attributes of the bi-directional solid-state switches as the maximum allowable charging current is controlled and varied.

5. The EVSE unit of claim 1 wherein the controller is further configured to adjust one or more circuit protection attributes of the bi-directional solid-state switches as PEVs plug into and unplug from the N number of charging stations.

6. The EVSE unit of claim 1 wherein:
the EVSE unit is configured in an electrical distribution panel, among other EVSE units,
the EVSE unit is communicatively coupled to the other EVSE units via an EVSE communications bus, and the controller of the EVSE unit is configured to communicate and coordinate with controllers in the other EVSE units and allocate or apportion supply current among the EVSE unit and other EVSE units.

7. The EVSE unit of claim 1 further comprising a ground-fault circuit interrupter (GFCI) or ground fault circuit transformer (GFCT) coupled in series with the bidirectional solid-state switches, wherein the GFCI or GFCT is configured to detect ground faults both when associated PEVs are plugged into the associated EV charging stations and when no PEV is plugged into the associated EV charging stations.

8. The EVSE unit of claim 7 wherein the GFCI or the GFCT is configured to detect and generate a ground fault sense signal for the controller in response to ground faults associated with the N number of phase conductors and the neutral conductor.

9. The EVSE unit of claim 1 further configured to communicate with external GFCIs or GFCTs configured to detect and generate ground fault sense signals for the controller in response to ground faults associated with the N number of phase conductors and the neutral conductor.

10. The EVSE unit of claim 9 wherein the EVSE unit is configure to share the external GFCI or GFCT with another EVSE unit.

11. The EVSE unit of claim 1 wherein:
the EVSE unit is configured in an electrical distribution panel, among other EVSE units,
the electrical distribution panel being configured to distribute a supply current to the EVSE unit and the other EVSE units,
the EVSE unit being communicatively coupled to the other EVSE units by way of a communication bus, and
the controller being configured to communicate and coordinate with controller of other EVSE units and allocate or apportion the supply current among the EVSE units.

12. An electric vehicle (EV) charging system comprising:
an N number of EV charging stations, wherein N is a counting number greater than zero;
a plurality of electric vehicle supply equipment (EVSE) units, each of which comprises a microcontroller unit (MCU) configured to provide individual and independent control of the of the N number of EV charging stations by controlling an N number of bi-directional solid-state switches and a driver configured to switch the N number of bi-directional solid-state switches to control a maximum allowable charging current available to an N number of a plurality of EV charging stations when one or more plug-in vehicle (PEVs) are plugged into associated ones of the N number of EV charging stations and provide circuit protection to the associated ones of the EV charging stations and the one or more PEVs;
an N number of phase conductors coupled between load-side terminals of the charging stations and corresponding ones of the N number of bi-directional solid-state switches;
an N number of disconnect units, one each of the N number of disconnect units being coupled in series with corresponding ones of the N number of bi-directional solid-state switches that are coupled between corresponding ones of line-side terminals and the load-side terminals;
wherein each of the plurality of EVSE units is configurable in three possible states for each of the N number of charging stations and at any given time is configured in one of the three possible states comprising:
an ON state during which the disconnect unit of associated ones of the N number of charging stations is closed and the bidirectional solid-state switch of the individual active ones of the N number of charging stations is ON;
a STANDBY state during which the disconnect unit of associated ones of the N number of charging stations is closed and the bidirectional solid-state switch of the individual active ones of the N number of charging stations is OFF; and
an OFF state during which the disconnect unit of associated ones of the N number of charging stations is open and the bidirectional solid-state switch of the individual ones of the N number of charging stations is OFF;
each of the plurality of the EVSE units generates the ON state for associated ones of the N number of charging stations when supplying charging current to the associated ones of the N number of charging stations but transitions temporarily from the ON state to the STANDBY state when dynamically adjusting the maximum allowable charging current available to associated PEVs from the associated N number of charging stations; and a neutral conductor coupled to a neutral terminal of the N number of EV charging stations, wherein the neutral conductor is configured to complete charging circuits with associated ones of the N number of phase conductors supplying charging current to the one or more PEVs.

13. The EV charging system of claim 12 wherein N equals one or two.

14. The EV charging system of claim 12 wherein N equals three.

15. The EV charging system of claim 13 further comprising a panel into which the plurality of EVSE units is integrated with a gateway and substantially low-voltage DC power and data module that is communicatively coupled with the MCUs by way of a communications bus.

16. The EV charging system of claim 15 wherein the N number of charging stations are arranged in pedestals that each comprise a smart pilot module that is communicatively coupled to the gateway and substantially low-voltage DC power and data module.

17. The EV charging system of claim 16 wherein the pedestals further comprise ground fault current transformers that are configured to detect ground faults associated with the N number of phase conductors and the neutral conductor and transmits the signal back to the EVSE to open the circuit.

18. An electric vehicle supply equipment (EVSE) unit configured in an EV charging system, the EVSE unit, comprising:
an N number of line-side terminals, wherein N is a counting number greater than zero;
an N number of load-side terminals;
a disconnect unit coupled between corresponding ones of the line-side terminals and the load-side terminals;
an N number of EV charging stations, one each coupled to corresponding ones of the N number of load-side terminals by an N number of phase conductors, wherein each of the N number of charging stations is configurable in three possible states for each of the N number of charging stations and at any given time is configured in one of the three possible states comprising:
an ON state during which the disconnect unit of associated ones of the N number of charging stations is closed and the bidirectional solid-state switch of the individual active ones of the N number of charging stations is ON;
a STANDBY state during which the disconnect unit of associated ones of the N number of charging stations is closed and the bidirectional solid-state switch of the individual active ones of the N number of charging stations is OFF; and
an OFF state during which the disconnect unit of associated ones of the N number of charging stations is open and the bidirectional solid-state switch of the individual ones of the N number of charging stations is OFF;
a neutral conductor coupled to a neutral terminal of the N number of EV charging stations, wherein the neutral conductor is configured to complete a charging circuit with an associated one of the N number of phase conductors supplying a charging current to a plug-in vehicle (PEV); and
a controller configured to provide individual and independent control of the N number of EV charging stations, wherein the controller and an electromechanical switch are configured both to control a maximum allowable charging current available to the N number of EV charging stations when one or more PEVs are plugged into associated ones of the N number of EV charging stations and to provide circuit protection to the associated ones of the EV charging stations and the one or more PEVs, and to generate the ON state for associated ones of the N number of charging stations when supplying charging current to the associated ones of the N number of charging stations but transitioning temporarily from the ON state to the STANDBY state when dynamically adjusting the maximum allowable charging current available to associated PEVs from the associated N number of charging stations.

19. The EVSE unit of claim 18 wherein the disconnect unit is an electromechanical switch of the relay type.

20. The EVSE unit of claim 18 wherein the disconnect unit is an electromechanical switch of the contactor type.

21. An electric vehicle (EV) charging system comprising:
an N number of EV charging stations, wherein N is a counting number greater than zero;
an N number of disconnect units, one each of the N number of disconnect units being coupled in series with corresponding ones of the N number of bi-directional solid-state switches that are coupled between corresponding ones of line-side terminals and the load-side terminals;
wherein each of the plurality of EVSE units is configurable in three possible states for each of the N number of charging stations and at any given time is configured in one of the three possible states comprising:
an ON state during which the disconnect unit of associated ones of the N number of charging stations is closed and the bidirectional solid-state switch of the individual active ones of the N number of charging stations is ON;
a STANDBY state during which the disconnect unit of associated ones of the N number of charging stations is closed and the bidirectional solid-state switch of the individual active ones of the N number of charging stations is OFF; and
an OFF state during which the disconnect unit of associated ones of the N number of charging stations is open and the bidirectional solid-state switch of the individual ones of the N number of charging stations is OFF;
each of the plurality of the EVSE units generates the ON state for associated ones of the N number of charging stations when supplying charging current to the associated ones of the N number of charging stations but transitions temporarily from the ON state to the STANDBY state when dynamically adjusting the maximum allowable charging current available to associated PEVs from the associated N number of charging stations;
a plurality of EVSE units, each of which comprises a microcontroller unit (MCU) wherein the MCU is configured to provide individual and independent control of the N number of EV charging stations by way of a disconnect unit configured to control a maximum allowable charging current available to an N number of a plurality of EV charging stations when one or more plug-in vehicle (PEVs) are plugged into associated ones of the N number of EV charging stations and provide circuit protection to the associated ones of the EV charging stations and the one or more PEVs;

an N number of phase conductors coupled between load-side terminals of the charging stations and corresponding ones of an N number of bi-directional solid-state switches; and a neutral conductor coupled to a neutral terminal of the N number of EV charging stations, wherein the neutral conductor is configured to complete charging circuits with associated ones of the N number of phase conductors supplying charging current to the one or more PEVs.

* * * * *